(12) United States Patent
Shinbata et al.

(10) Patent No.: US 7,564,582 B2
(45) Date of Patent: Jul. 21, 2009

(54) IMAGE PROCESSING APPARATUS, IMAGE PROCESSING METHOD, AND RECORDING MEDIUM

(75) Inventors: Hiroyuki Shinbata, Tochigi-ken (JP); Takahiro Oshino, Tochigi-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 687 days.

(21) Appl. No.: 10/912,129

(22) Filed: Aug. 6, 2004

(65) Prior Publication Data

US 2005/0135665 A1     Jun. 23, 2005

Related U.S. Application Data

(62) Division of application No. 09/396,740, filed on Sep. 15, 1999, now Pat. No. 7,050,648.

(30) Foreign Application Priority Data

| Sep. 18, 1998 | (JP) | ............................ 10-265354 |
| Sep. 25, 1998 | (JP) | ............................ 10-272281 |
| Sep. 25, 1998 | (JP) | ............................ 10-272283 |
| Sep. 8, 1999 | (JP) | ............................ 11-254184 |

(51) Int. Cl.
*H04N 1/40*     (2006.01)

(52) U.S. Cl. ........................................ 358/1.9; 382/274
(58) Field of Classification Search ......... 382/260–269, 382/199–200, 274; 358/1.9, 2.1, 3.06, 3.09–3.14, 358/3.16

See application file for complete search history.

(56) References Cited

U.S. PATENT DOCUMENTS

| 5,745,173 A | 4/1998 | Edwards et al. ........... 348/208.4 |
| 5,796,870 A | 8/1998 | Takeo .......................... 382/232 |
| 5,905,817 A | 5/1999 | Matama ...................... 382/260 |
| 6,101,273 A | 8/2000 | Matama ...................... 382/169 |
| 6,470,101 B1 | 10/2002 | Nakamura ................... 382/319 |

*Primary Examiner*—Thomas D Lee
*Assistant Examiner*—Stephen M Brinich
(74) *Attorney, Agent, or Firm*—Fitzpatrick, Cella, Harper & Scinto

(57) ABSTRACT

An image processing method comprises an extracting process of extracting a characteristic amount of an input image, a generating process of generating a high frequency component of the input image, a gradation converting process of converting a gradation of the input image on the basis of the characteristic amount, and an adding process of adding the high frequency component to the input image whose gradation has been converted.

14 Claims, 28 Drawing Sheets

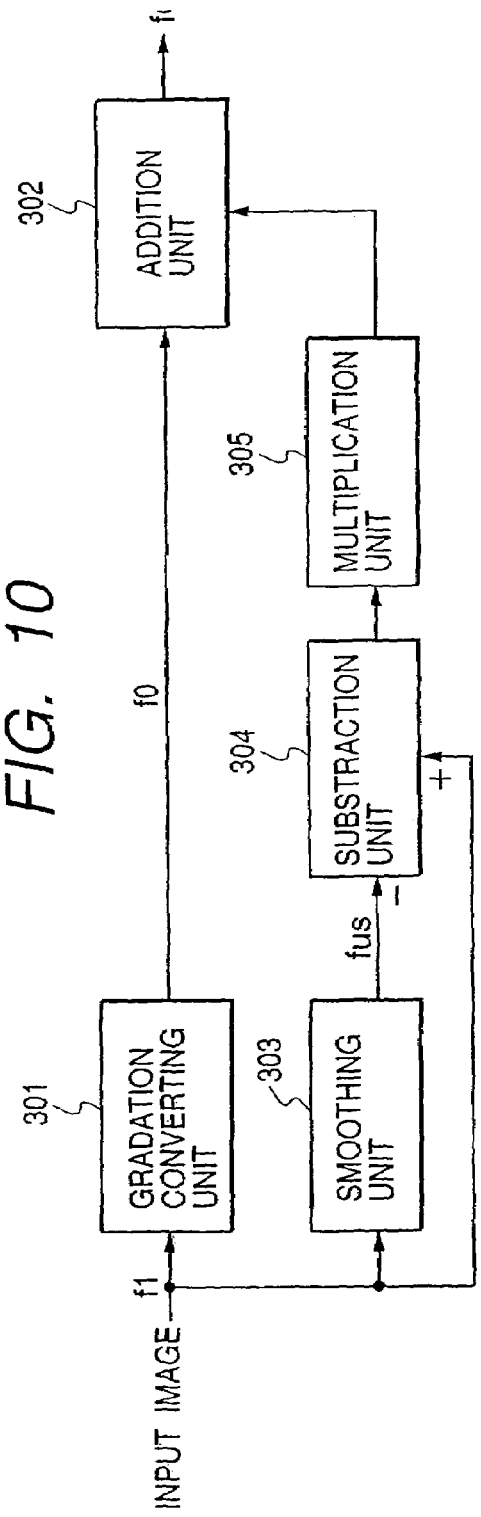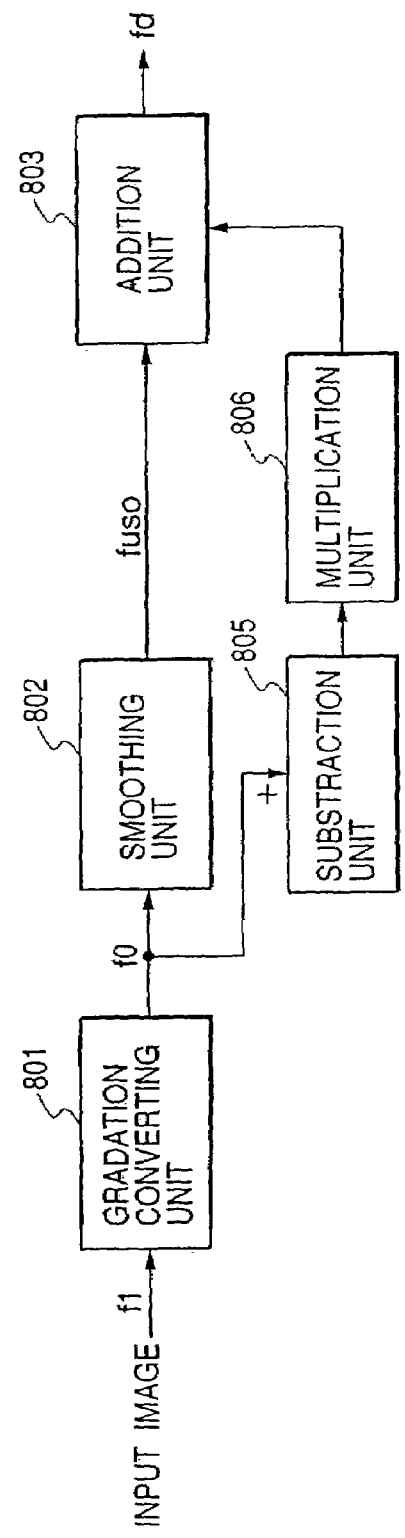

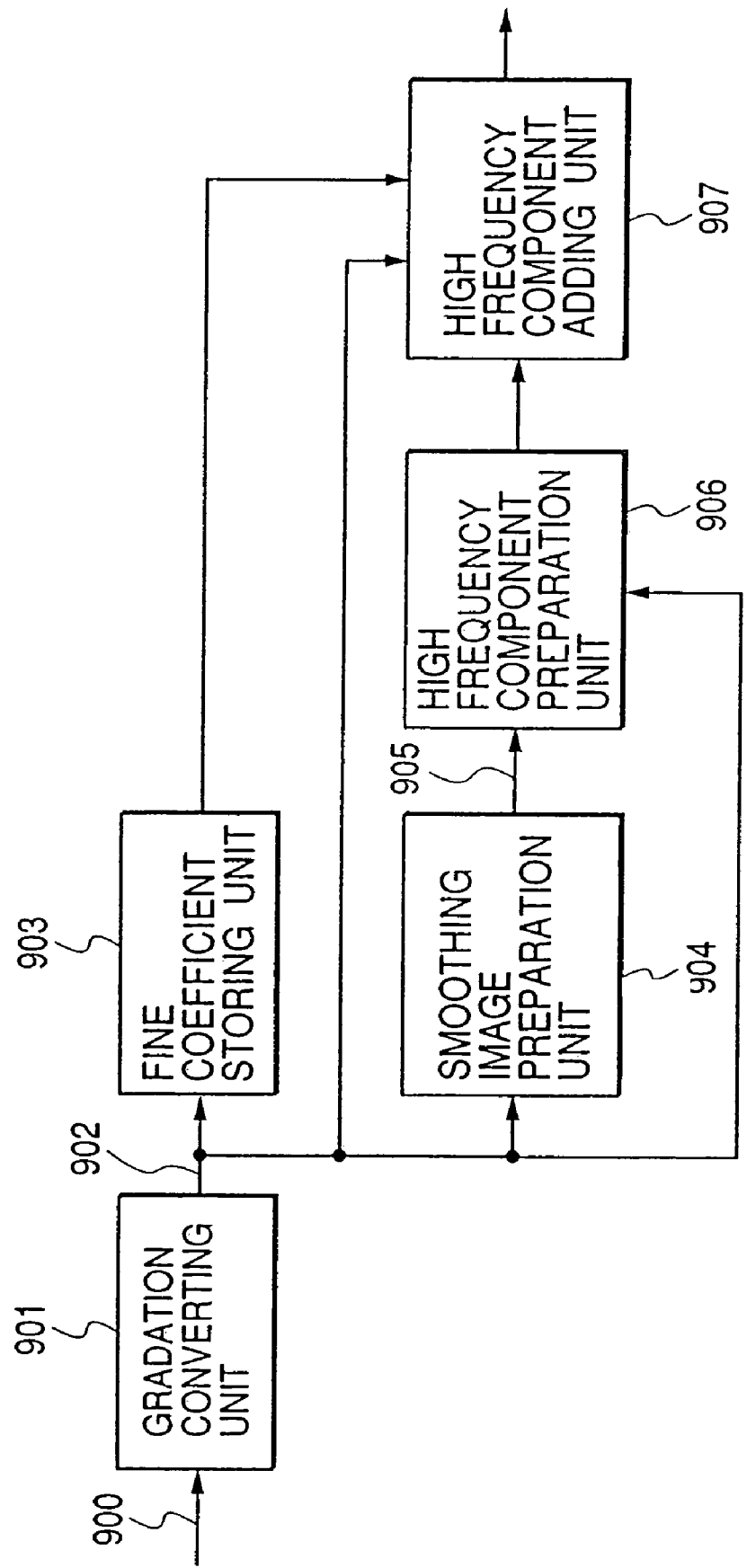

IMAGE PROCESSING APPARATUS, IMAGE PROCESSING METHOD, AND RECORDING MEDIUM

CROSS REFERENCE TO RELATED APPLICATION

This application is a division of application Ser. No. 09/396,740, filed Sep. 15, 1999, the entire contents of which are hereby incorporated herein by reference.

BACKGROUND OF THE INVENTION

1. Field of the Invention

The present invention relates to an image processing apparatus and its method for converting a gradation with keeping a high frequency component of an image such as an X-ray image, and a computer-readable storage medium used therefor.

2. Related Background Art

For example, an X-ray chest image is composed of an image of a lung field through which an X-ray is easy to pass and an image of a mediastinum portion through which an X-ray is hard to pass, and therefore pixel values exist in an extremely wide range. Accordingly it has been considered to be hard to obtain an X-ray chest image on which both of the lung field and the mediastinum portion can be observed simultaneously.

Therefore, various methods described below have been conventionally suggested as methods of resolving this problem.

First, there is a method disclosed in SPIE Vol. 626. Medicine XIV/PACSIV (1986). This method is expressed-by the following formula (1):

$$S_D = A[S_{ORG} - S_{US} + B(S_{US})] + C \quad (1)$$

where $S_D$ is a pixel value after processing, $S_{ORG}$ is an original pixel value (input pixel value), $S_{US}$ is a pixel value of a low frequency image of an original image (input image), and constants A, B, and C (for example, A=3, B=0.7).

In this method, it is possible to change weights of a high frequency component (first term) and a low frequency component (second term). For example, if A=3 and B=0.7, the high frequency component is highlighted and the entire dynamic range is compressed advantageously. This method is appreciated by five radiotherapists in that the processed image is useful for a diagnosis in comparison with a non-processed image.

In addition, there is disclosed a method in Japanese Pat. No. 2509503 which is expressed by the following formula (2):

$$S_D = S_{ORG} + F[G(Px, Py)] \quad (2)$$

where $S_D$ is a pixel value after processing, $S_{ORG}$ is an original pixel value (input pixel value), and Py is an average profile in a Y direction profile and Px is an average profile in a X direction profile of an original image (input image).

Characteristics of the function f(x) is described below. First, f(0) becomes "0" in "x>Dth" and f(x) monotonously decreases with "E" as an intercept and "E/Dth" as a slope in "$0 \leq x \leq Dth$" as expressed by the following formula (3):

$$F[x] = E - (E/th)X \quad (3)$$

$$Py = (\Sigma Pyi)/n \quad (4)$$

$$Px = (\Sigma Pxi)/n \quad (5)$$

where (i=1~n), Pyi, and Pxi are profiles. They are expressed by the following formula (6), for example:

$$G = (Px, Py) = \max(px, py) \quad (6)$$

In this method, a density range of pixel values Dth and lower of a low frequency image is compressed.

In addition, as a similar method to the above patent gazette, there is a method referred to as a self-compensatory digital filter in "Self-compensatory Digital Filter," National Cancer Center, Anan et al in Japan Radiation Technical Society Journal Vol. 45, Issue 8, Aug. 1989, pp. 1,030. This method is expressed by the following formulas (7) and (8):

$$S_D = S_{ORG} + f(S_{US}) \quad (7)$$

$$S_{US} = \Sigma S_{ORG}/M^2 \quad (8)$$

where $S_D$ is a pixel value after compensation (after processing), $S_{ORG}$ is an original pixel value (input pixel value), $S_{US}$ is an average pixel value of a moving average with a mask size of M×M pixels of an original image (input image), and a monotonously decreasing function f(X) shown in FIG. 35.

Next, characteristics of the function $f(S_{US})$ is described below. First, regarding the characteristics shown in FIG. 35, $f(S_{US})$ becomes "0" if "$S_{US}$>BASE" and $f(S_{US})$ monotonously decreases with "threshold value BASE" as an intercept and SLOPE as a slope if "$0 \leq S_{US} \leq BASE$." Therefore when executing the above formula (7) with the original pixel value $S_{ORG}$ as a density equivalent amount, an effect to an image is obtained such as an increase of a density in a range of a lower average density of the image.

This method is different from the method expressed by the formula (2) in a low frequency image preparing method; a low frequency image is prepared with two-dimensional data in this method while it is prepared with one-dimensional data in the formula (2). In this method, however, a density range of pixel values Dth and lower of the low frequency image is compressed in the same manner.

Furthermore, there is disclosed a method in Japanese Pat. No. 2663189 which is expressed by the following formulas (9) and (10):

$$S_D = S_{ORG} + f1(S_{US}) \quad (9)$$

$$S_{US} = \Sigma S_{ORG}/M^2 \quad (10)$$

where f1(X) is a monotonously increasing function.

Characteristics of the function f1(x) is described below. First, f1(x) becomes "0" in "x<Dth" and f1(x) monotonously decreases with "E" as an intercept and "E/Dth" as a slope in "$Dth \leq x$" as expressed by the following formula (11):

$$f1[x] = E - (E/th)X \quad (11)$$

Still further, there is disclosed a vivifying method of highlighting a high frequency component of an image having fixed or greater density values in Japanese Pat. No. 1530832. In this method, an extremely low frequency component is highlighted and a high frequency component having a high occupancy rate of noises is relatively reduced in order to obtain an image easy to see and to improve a diagnostic performance by preventing a false image or an increase of noises.

There is a method expressed by the following formulas (12) and (13):

$$S_D = S_{ORG} + B(S_{ORG} - S_{US}) \quad (12)$$

$$S_{US} = \Sigma S_{ORG}/M^2 \quad (13)$$

where the constant B is a variable monotonously increasing according to an increase of the $S_{OR}$ or $S_{US}$ value. When executing the above formula (12), a high frequency component of an image can be highlighted advantageously.

The above method in SPIE Vol. 626. Medicine XIV/PAC-SIV (1986), however, does not have a concept of compressing a dynamic range of a fixed density range, and therefore a dynamic range of the entire image is equally compressed. Accordingly only a fixed density range cannot be compressed, by which if this method is used for a lung front image, for example, there is a problem that not only the mediastinum portion but a density range of a lung portion useful for a diagnosis is compressed and therefore the diagnostic function is degraded in comparison with a method of compressing only the mediastinum portion.

The above "self-compensatory digital filter" method has a problem that an unnatural distortion may be generated in a high frequency component unless a form of the above function $f(S_{US})$ is adapted to decrease to BASE at a fixed ratio (it must be linear). Therefore, it has a problem that a gradation cannot be compressed non-linearly and freely with keeping an amplitude of a high frequency component at an amplitude of a high frequency component of the original image (input image).

In addition, generally an image whose dynamic range has been compressed is converted in its gradation again in a CRT display or a film output. The above "self-compensatory digital filter" method or the like does not have a concept of adjusting an amplitude of a high frequency component of the image after the gradation is converted, and therefore the image whose dynamic range has been compressed is further non-linearly converted in its gradation in a film output and an image display. Accordingly, the conversion depends upon a slope of a gradation conversion curve and the amplitude of the high frequency component fluctuates. Therefore, it has problems that the amplitude after the gradation conversion is distorted non-linearly and that the amplitude of a high frequency component becomes low in a range where the gradation conversion curve has a low slope by which an instructive information disappears even if the dynamic range is compressed with keeping the amplitude of the high frequency component. Furthermore, it has also a problem that an overshoot or an undershoot may occur in an edge portion.

Furthermore the above conventional vivifying method of highlighting a high frequency component does not have a concept of compressing the dynamic range while the strength of a high frequency component addition can be freely adjusted, and therefore it has a problem that an image having a wide range of a density distribution cannot be displayed on a single film sheet.

The present invention is provided to solve these problems and it is an object of the present invention to freely adjust a range of a density distribution of an image and an amplitude of a high frequency component.

SUMMARY OF THE INVENTION

It is an object of the present invention to reproduce a noted area favorably.

According to one aspect, the present invention which achieves this object related to an image processing method including an extracting process of extracting a characteristic amount of an input image, a generating process of generating a high frequency component of the input image, a gradation converting process of converting a gradation of the input image on the basis of the characteristic amount, and an adding process of adding the high frequency component to the input image whose gradation has been converted.

It is another object of the present invention to convert a dynamic range according to a medical input image so as to output an image which is effective in a favorable diagnosis.

According to another aspect, the present invention which achieves this object relates to an image processing method including an extracting process of extracting a characteristic amount of a medical input image and an output process of outputting the medical image for which a first or a second dynamic range conversion has been performed, having the first dynamic range converting process of converting a dynamic range using a first algorithm on the basis of the characteristic amount and the second dynamic range converting process of converting a dynamic range using a second algorithm on the basis of the characteristic amount.

BRIEF DESCRIPTION OF THE DRAWINGS

FIG. 10 is a block diagram of an image processing device according to the third embodiment;

FIG. 11 is a block diagram of an image processing device according to the eighth embodiment;

FIG. 12 is a block diagram of an image processing device according to a ninth embodiment;

DETAILED DESCRIPTION OF THE PREFERRED EMBODIMENTS

Embodiments of the present invention will be described below with reference to accompanying drawings.

First Embodiment

A first embodiment is described below, first.

Figure 2:
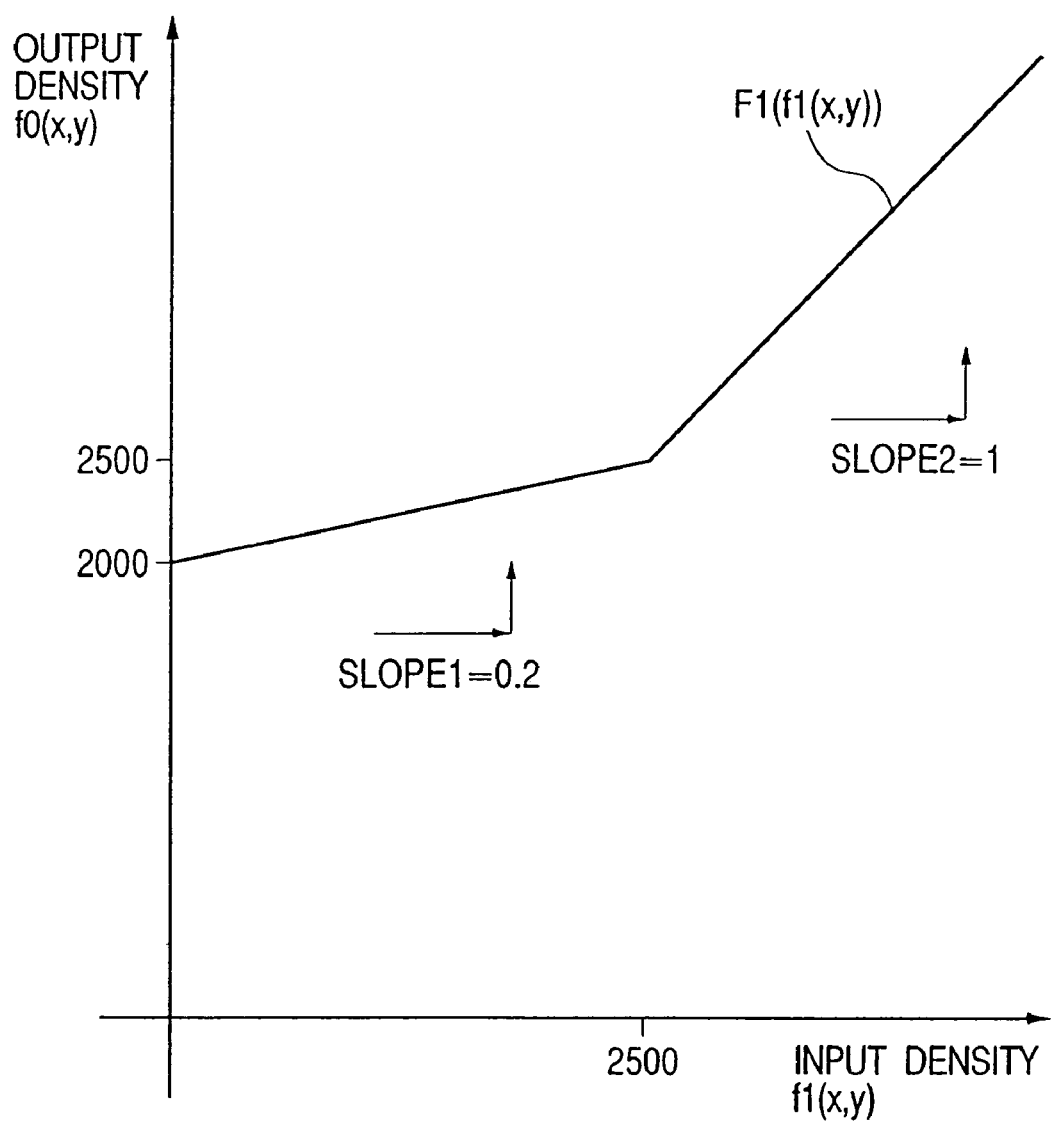
FIG. 2 is a characteristic diagram showing a gradation conversion function F1( ) according to the first and eight embodiments.

Referring to FIG. 2, there is shown a gradation conversion function F1( ) used in the first embodiment. In this diagram, it is assumed that f1(x, y) is a density value of a two-dimensional input original image, f0(x, y) is a density value of an output image after a two-dimensional gradation conversion (a converted image), and characters x, y indicate two-dimensional coordinates. In addition, an abscissa axis is assumed to indicate a density value f1(x, y) of the input image and an ordinate axis is to indicate a density value f0(x, y) of the output image (the converted image). In this gradation conversion curve, a slope (SLOPE) of a 2,500 or lower input density value is 0.2 and a slope of an input density value more than 2,500 is 1.

Figure 3:
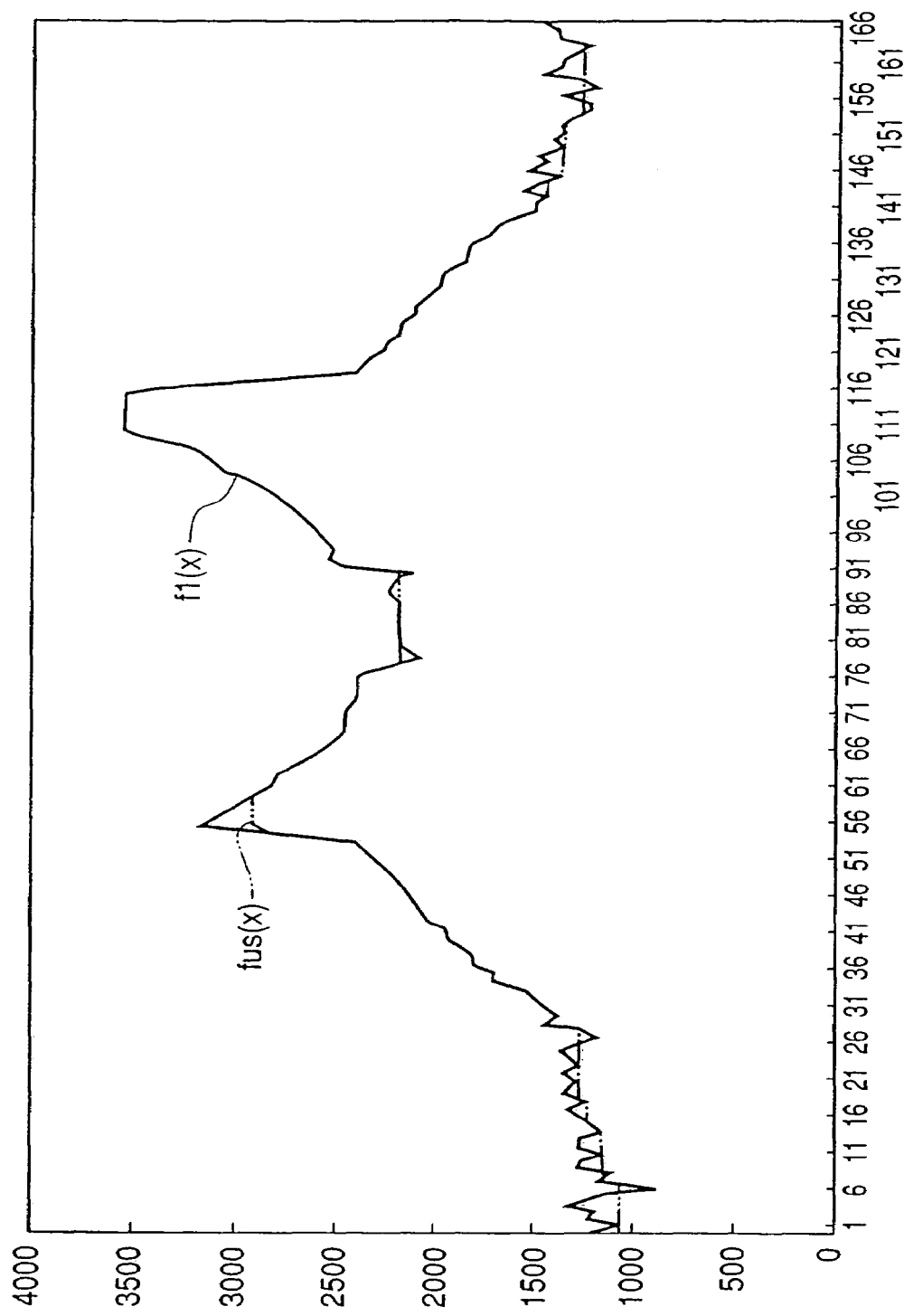
FIG. 3 is a characteristic diagram showing a profile of a smoothed image based on an input image and a morphological filter according to the first embodiment.

In FIG. 3, a solid line indicates a profile f1(X) of an input image and a dotted line indicates a profile fus(X) of a smoothed (low frequency) image fus(x, y).

Figure 4:
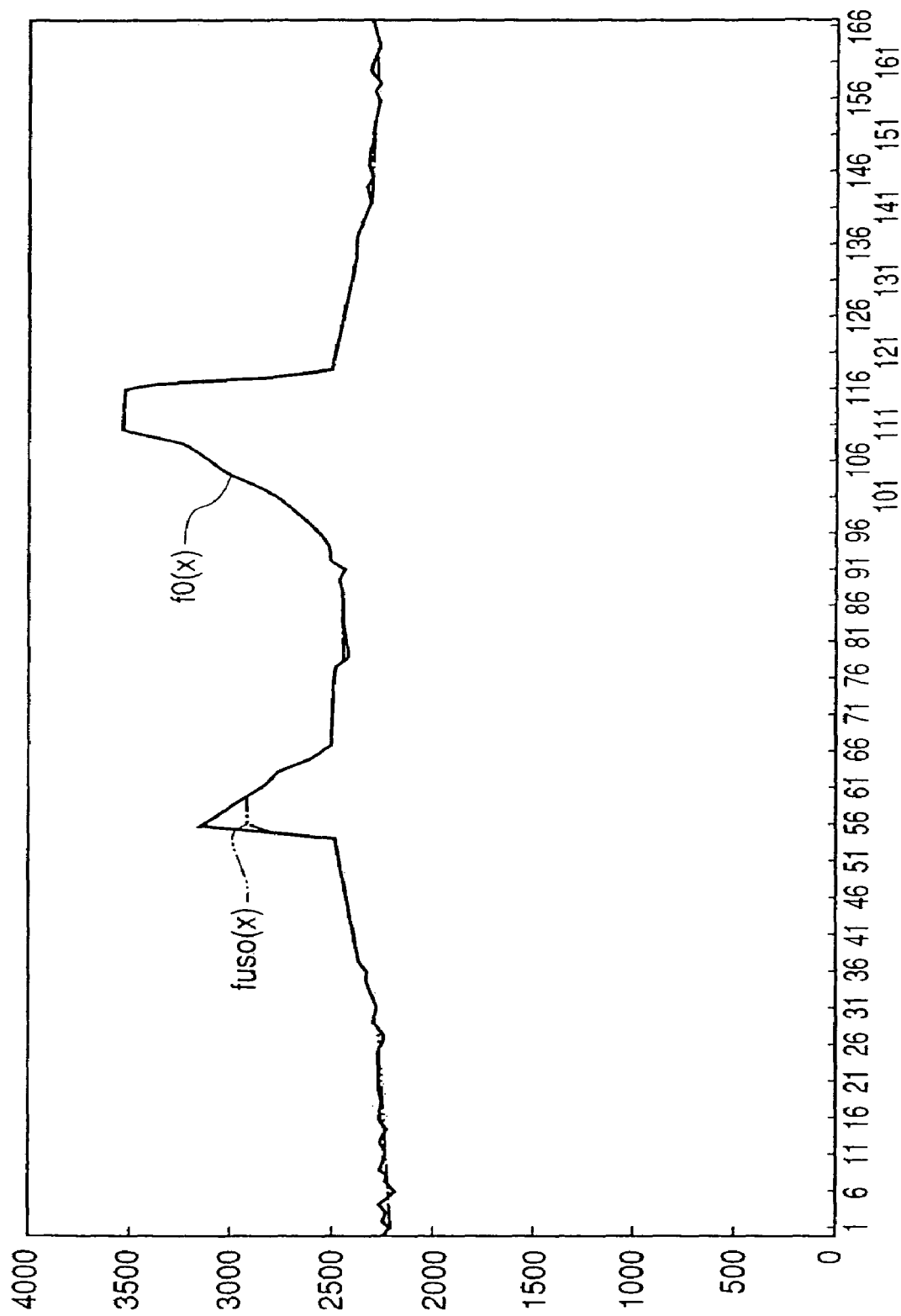
FIG. 4 is a characteristic diagram showing a profile of a smoothed image based on a gradation converted image and a morphological filter according to the first and eighth embodiments.

In FIG. 4, a solid line indicates a profile f0(X) of an image obtained by converting a gradation of the input image based on the gradation conversion curve shown in FIG. 2 and a dotted line indicates a profile fuso(X) of the smoothed (low frequency) image of the gradation converted image, where X is a constant.

Figure 5:
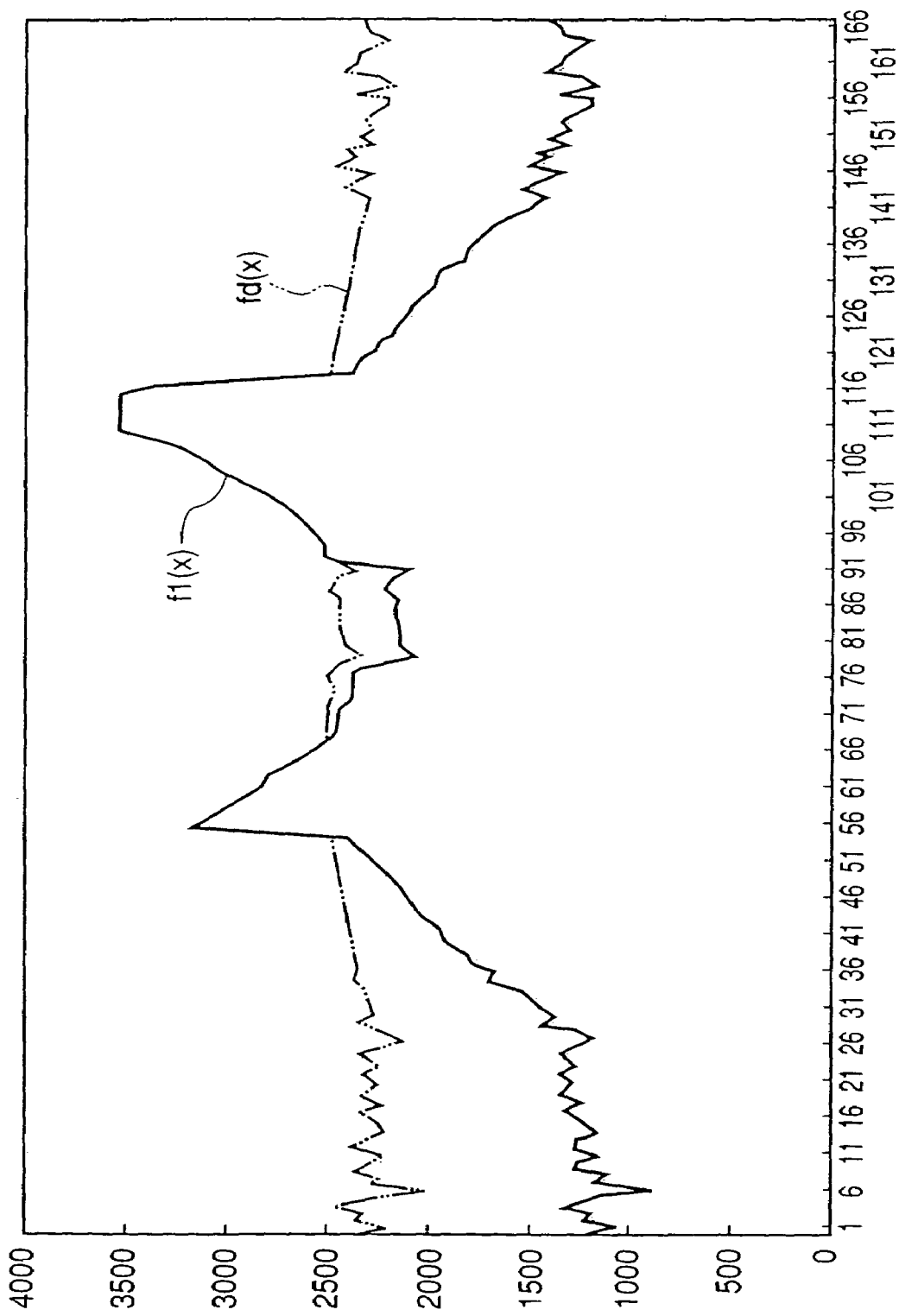
FIG. 5 is a characteristic diagram showing a profile of an input image and a processed image according to the first and eighth embodiments.

Referring to FIG. 5, there is shown a result of an image processing method according to this embodiment, in which a solid line indicates a profile f1(X) of an input image and a dotted line indicates a profile fd(X) of a processed image which has been processed according to this embodiment.

Next, the operation is described.

First, an input image f1(x, y) is converted in its gradation with a gradation conversion function F1( ) shown in FIG. 2 as shown in the following formula (14) to obtain an output image f0(x, y):

$$f0(x, y) = F1(f1(x, y)) \tag{14}$$

A pixel value fd(x, y) of the processed image is obtained on the basis of the following formula (15):

$$fd(x, y) = fuso(x, y) + F(x, y) \times (f1(x, y) - fus(x, y)) \tag{15}$$

where F(x, y) is a function representing a processing effect depending upon coordinates assuming F(x, y)=1 in this embodiment.

In this formula, fuso(x, y) is a smoothed (low frequency) image of an output image (a converted image) f0(x, y) and fus(x, y) is a smoothed (low frequency) image of an input image f1(x, y), which are obtained by formulas (16) to (20) described later, for example. Both of an average density and an erosion, dilation, opening, or closing morphological filter can be used for smoothing.

In the gradation conversion curve F1( ) (FIG. 2) used in this embodiment, an amplitude of a high frequency component having a 2,500 or lower density value of the output image f0(x, y) is compressed to 20%, while a high frequency component preserves an amplitude of the input image if the density value is more than 2,500 (indicated by a solid line in FIG. 4).

The above fus(x, y) is assumed to be calculated by formulas (16) to (20), supposing that f1(x, y) is a two-dimensional input original image:

$$f2(x, y) = \min\{f1(x+x1, y+y1) - D(x1, y1) | x1 \times x1 + y1 \times y1 \leq r1 \times r1\} \tag{16}$$

$$f3(x, y) = \max\{f2(x+x1, y+y1) + D(x1, y1) | x1 \times x1 + y1 \times y1 \leq r1 \times r1\} \tag{17}$$

$$f4(x, y) = \max\{f3(x+x1, y+y1) + D(x1, y1) | x1 \times x1 + y1 \times y1 \leq r1 \times r1\} \tag{18}$$

$$fus(x, y) = \min\{f4(x+x1, y+y1) - D(x1, y1) | x1 \times x1 + y1 \times y1 \leq r1 \times r1\} \tag{19}$$

where D(x, y) is a disc filter and r1 is an arbitrary constant selected according to an input image.

$$D(x, y) = 0, \quad x \times x + y \times y \leq r1 \times r1 \tag{20}$$
$$= -\infty, \text{ etc.}$$

A profile fus(X) (indicated by a dotted line in FIG. 3) of the fus(x, y) obtained here preserves an edge structure, and it does not cause any overshoots nor undershoots which are disadvantages of the conventional dynamic range compression.

In the same manner, fuso(x, y) is assumed to be calculated by formulas (21) to (24), supposing that f0(x, y) is an image after a gradation conversion:

$$f5(x, y) = \min\{f0(x+x1, y+y1) - D(x1, y1) | x1 \times x1 + y1 \times y1 \leq r1 \times r1\} \tag{21}$$

$$f6(x, y) = \max\{f5(x+x1, y+y1) + D(x1, y1) | x1 \times x1 + y1 \times y1 \leq r1 \times r1\} \tag{22}$$

$$f7(x, y) = \max\{f6(x+x1, y+y1) + D(x1, y1) | x1 \times x1 + y1 \times y1 \leq r1 \times r1\} \tag{23}$$

$$fuso(x, y) = \min\{f8(x+x1, y+y1) - D(x1, y1) | x1 \times x1 + y1 \times y1 \leq r1 \times r1\} \tag{24}$$

A profile fuso(X) (indicated by a dotted line in FIG. 4) of the fuso(x, y) obtained here preserves an edge structure, and an intersection point position with f0(X) matches an intersection point position of fus(X) and f1(X).

A dotted line in FIG. 5 indicates a profile fd(X) of an obtained processed image fd(x, y). The density distribution range of 2,500 or lower density values is compressed to 20% of the input image and a high frequency component preserves an amplitude of the input image.

Figure 1:
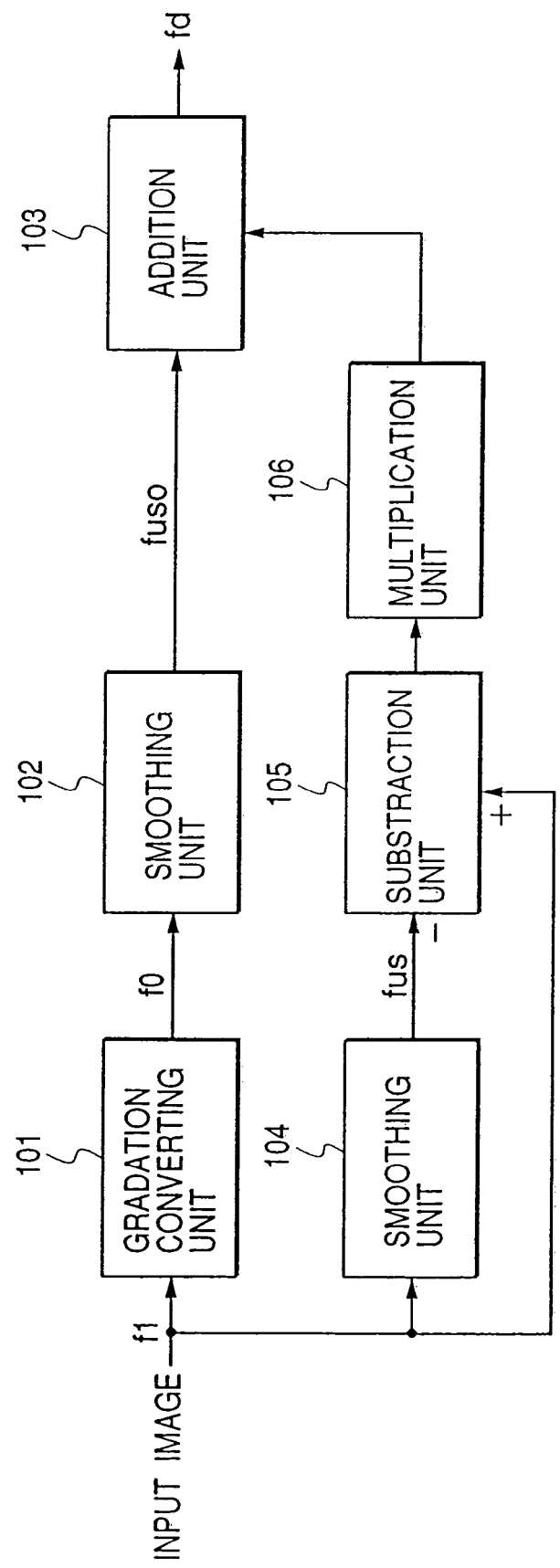
FIG. 1 is a block diagram of an image processing device according to a first embodiment.

Referring to FIG. 1, there is shown a block diagram of a constitution of an image processing device according to this embodiment, which realizes the above formula (15).

In FIG. 1, an input image f1 is converted in its gradation on the basis of the function in FIG. 2 by a gradation converting unit 101 and a converted image f0 is obtained. This converted image f0 is smoothed by a smoothing unit 102 so as to obtain a smoothed image fuso and the obtained image is sent to an addition unit 103.

On the other hand, the above input image f1 is smoothed by another smoothing unit 104 and a smoothed image fus is obtained. Next, the smoothed image fus is subtracted from the input image f1 by a subtraction unit 105, by which a high frequency component image is obtained. This high frequency component image is subjected to a constant multiplication by a multiplication unit 106 and to an addition to the above smoothed image fuso by the addition unit 103, by which a processed image fd is obtained.

As described above, according to the first embodiment, it becomes possible to compress or expand a density distribution range of an arbitrary gradation area of the input image and to adjust freely the amplitude of a high frequency component after the gradation conversion.

Second Embodiment

A second embodiment is described below.

Figure 6:
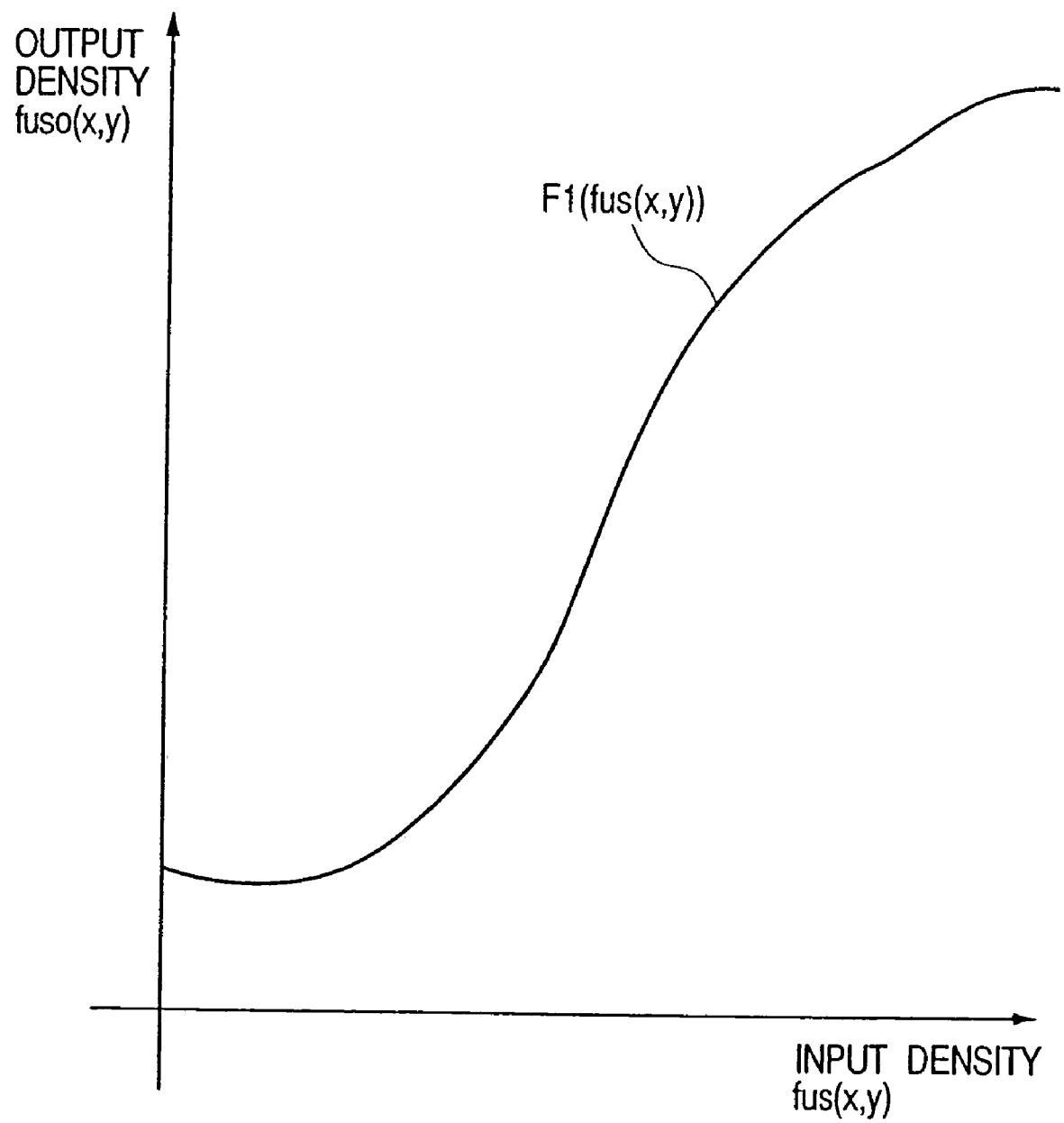
FIG. 6 is a characteristic diagram showing a gradation conversion function F1( ) according to a second embodiment.

Referring to FIG. 6, there is shown a gradation conversion function F1( ) used for an image processing method according to the second embodiment. In this diagram, it is assumed that f1(x, y) is a density value of a two-dimensional input original image, fus(x, y) is a smoothed (low frequency) image of the input image, and fus0(x, y) is an output image after a gradation conversion (a converted image).

Next, the operation is described.

First, a smoothed image fus(x, y) of an input image f1(x, y) is generated by using the formulas (16) to (20), for example and a gradation conversion is performed as shown in the following formula (25) with a gradation conversion function F1( ) shown in FIG. 6 to obtain an output image fus0(x, y):

$$fus0(x, y)=F1(fus(x, y)) \quad (25)$$

A pixel value fd(x, y) of the processed image is obtained on the basis of the following formula (26):

$$fd(x, y)=fus0(x, y)+F(x, y)\times(f1(x, y)-fus(x, y)) \quad (26)$$

where F(x, y) is a function representing a processing effect depending upon coordinates.

Figure 7:
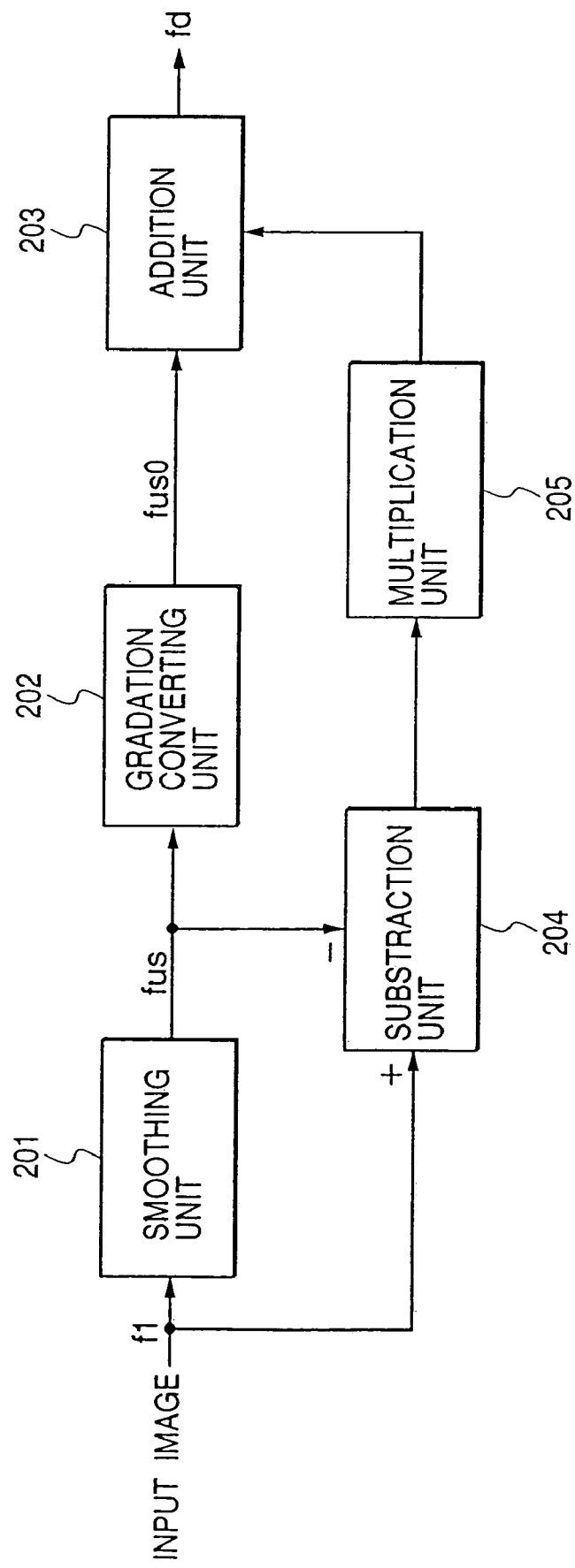
FIG. 7 is a block diagram of an image processing device according to the second embodiment.

Referring to FIG. 7, there is shown a constitution of an image processing device according to this embodiment, which realizes the above formula (26).

In FIG. 7, an input image f1 is smoothed by a smoothing unit 201 to obtain a smoothed image fus, the smoothed image fus is sent to a subtraction unit 204 and converted in its gradation on the basis of the function in FIG. 6 by a gradation converting unit 202 to obtain a converted image fus0, and the converted image is sent to an addition unit 203.

On the other hand, the above smoothed image fus is subtracted from the input image f1 by the subtraction unit 204 to obtain a high frequency component image. This high frequency component image is subjected to a constant multiplication by a multiplication unit 205 and to an addition to the above output image fus0 by the addition unit 203, by which a processed image fd is obtained.

As described above, according to the second embodiment, it becomes possible to omit a time for generating a smoothed image after converting a gradation and to reduce a calculation time in comparison with the first embodiment. In addition, it also possible to compress or expand a density distribution range of an arbitrary gradation area of the input image and to adjust freely the amplitude of the high frequency component after the gradation conversion.

Third Embodiment

A third embodiment is described below.

Figure 8:
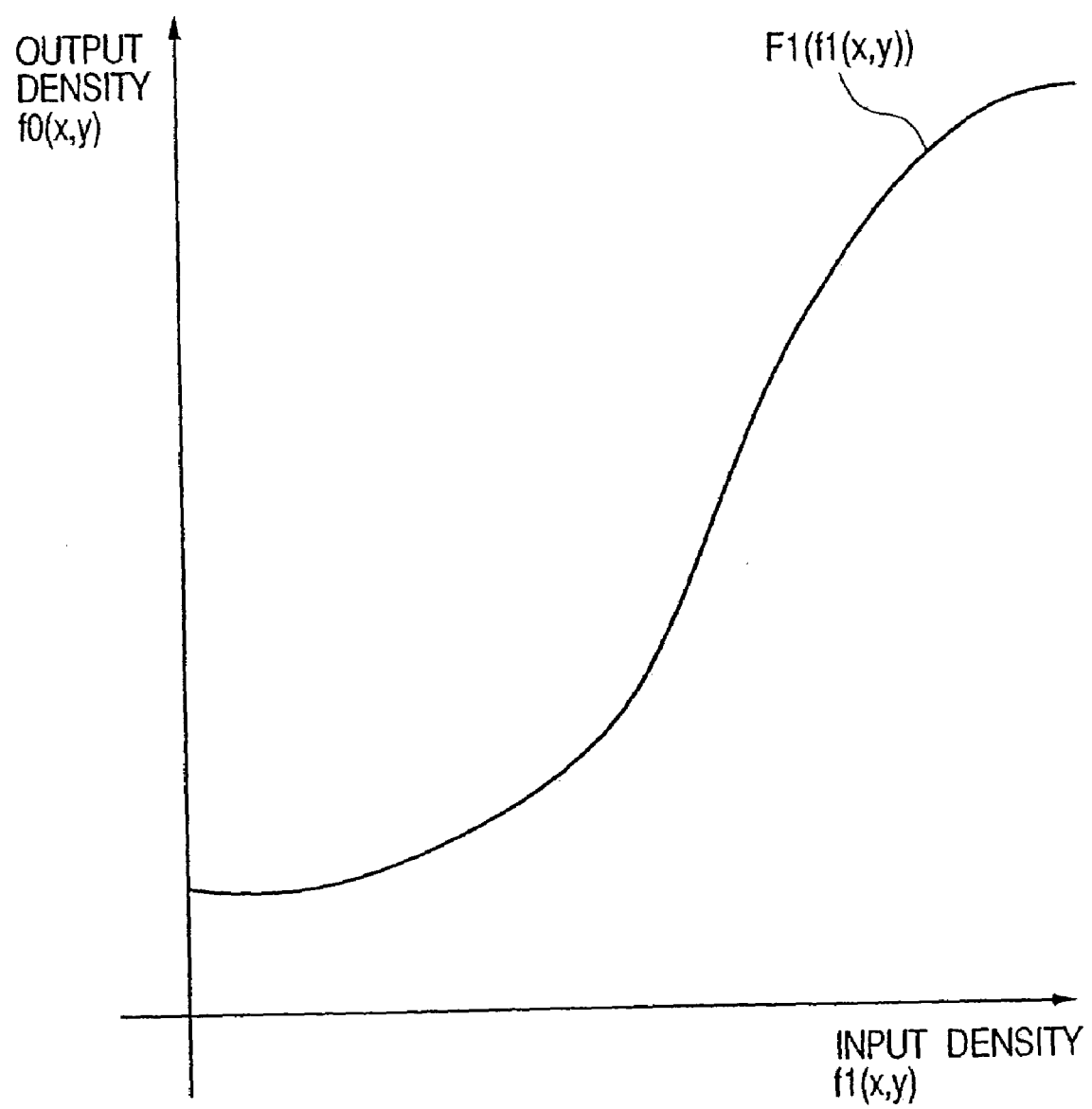
FIG. 8 is a characteristic diagram showing a gradation conversion function F1( ) according to a third embodiment.

Referring to FIG. 8, there is shown a gradation conversion function F1( ) used for an image processing method according to the third embodiment. In this diagram, it is assumed that f1(x, y) is a density value of a two-dimensional input original image, f0(x, y) is a density value of an output image after a two-dimensional gradation conversion, and characters x, y indicate two-dimensional coordinates. In addition, an abscissa axis indicates a density value f1(x, y) of the input image and an ordinate axis indicates a density value f0(x, y) of the output image.

Figure 9:
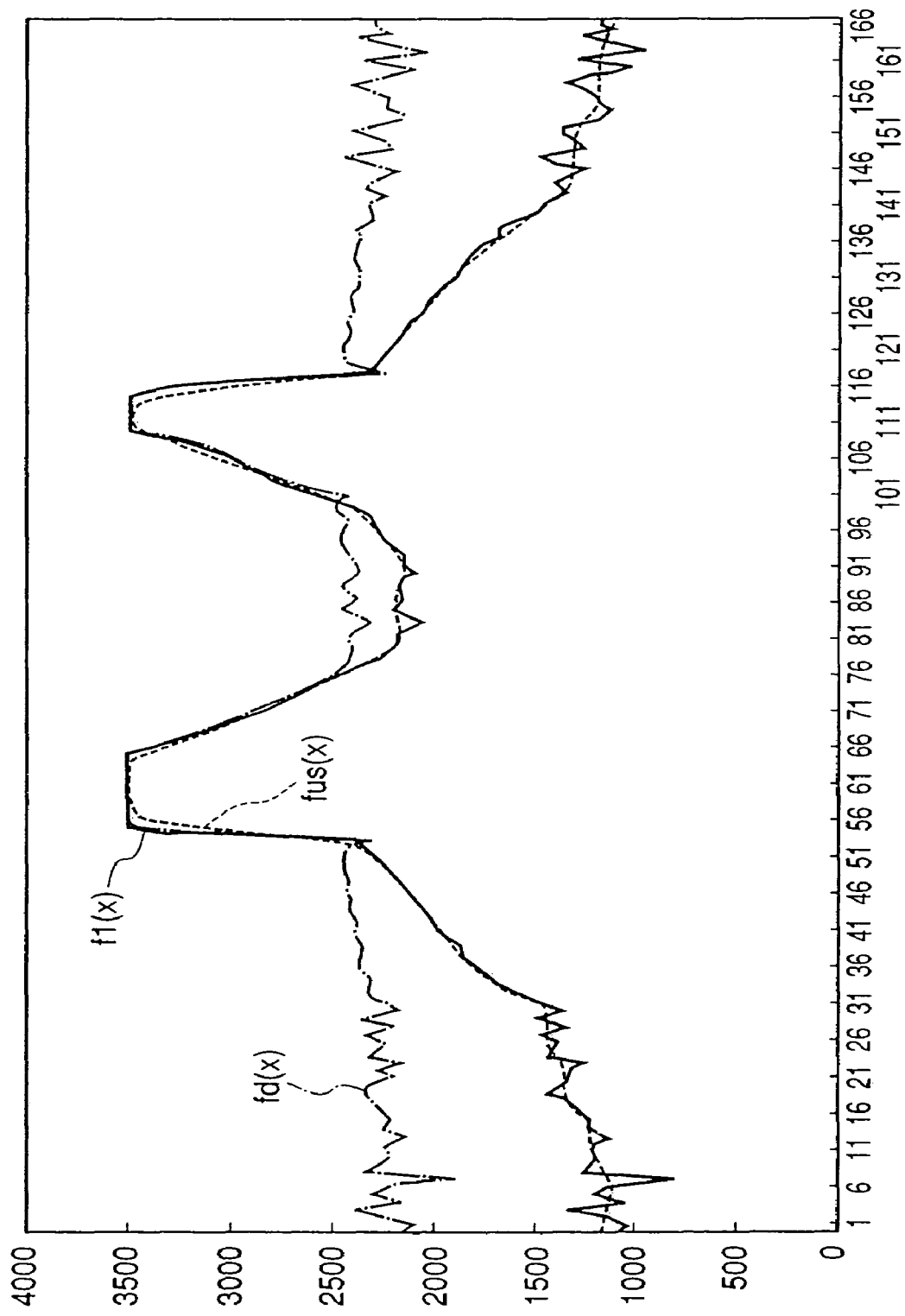
FIG. 9 is a characteristic diagram showing a profile of an input image, a smoothed image of the input image, and a processed image according to the third embodiment.

In FIG. 9, a solid line indicates a profile f1(X) of an input image, a dotted line indicates a profile fus(X) of a smoothed (low frequency) image fus(x, y), and a long and short dash line indicates a profile fd(X) of the processed image.

Next, the operation is described.

First, an input image f1(x, y) is converted in its gradation with a gradation conversion function F1( ) shown in FIG. 8 as shown in the following formula (27) to obtain an output image (a converted image) f0(x, y):

$$f0(x, y)=F1(f1(x, y)) \quad (27)$$

A pixel value fd(x, y) of the processed image is obtained on the basis of the following formulas (28) and (29):

$$c(x, y)=\partial F1(f1(x, y))/\partial f1(x, y) \quad (28)$$

$$fd(x, y)=f0(x, y)+(1-c(x, y))\times(f1(x, y)-fus(x, y)) \quad (29)$$

where c(x, y) is a gradation conversion rate defined by the formula (28).

In this formula, fus(x, y) is a smoothed (low frequency) image of an input image f1(x, y), which is expressed by a formula (30), for example.

$$fus(x, y) = \frac{\int_{-d}^{d}\int_{-d}^{d} f0(x+x1, y+y1)dx1\,dy1}{\int_{-d}^{d}\int_{-d}^{d} dx1\,dy1} \quad (30)$$

Any method can be used for the smoothing described above; for example, an erosion, dilation, opening, or closing morphological filter can be used, for example.

Referring to FIG. 10, there is shown a constitution of an image processing device according to this embodiment, which realizes the above formula (29).

In FIG. 10, an input image f1 is converted in its gradation on the basis of the gradation conversion curve in FIG. 8 by a gradation converting unit 301 to obtain a converted image f0 and the converted image f0 is sent to an addition unit 302. On the other hand, the above input image f1 is smoothed by a smoothing unit 303 and a smoothed image fus is obtained. The smoothed image fus is subtracted from the input image f1 by a subtraction unit 304, by which a high frequency component image is obtained. This high frequency component image is added to the above converted image f0 by the addition unit 302, by which a processed image fd is obtained.

As described above, according to the third embodiment, it becomes possible to compress or expand a density distribution range of an arbitrary gradation area of the input image and to adjust the amplitude of the high frequency component after the gradation conversion so as to be identical to the amplitude of the high frequency component of the input image. In addition, it is also possible to reduce a calculation time since a smoothing processing is required only once. Furthermore, the smoothing method with an average density has an advantage of reducing a calculation time in morphological filter processing.

Fourth Embodiment

A fourth embodiment is described below.

This embodiment is expressed by an arithmetic expression (31) or (32) with a pixel value fd(x, y) of a processed image, a pixel value fuso(x, y) of a smoothed image of a first image (an output image after a gradation conversion) f0(x, y), a pixel value f1(x, y) of a second image (an input image), a pixel value fus(x, y) of a smoothed (low frequency) image of the second image, a function F( ) for controlling processing effects, and coordinates x and y on the image.

$$fd(x, y)=fuso(x, y)+F(f1(x, y))\times(f1(x, y)-fus(x, y)) \quad (31)$$

$$fd(x, y)=f0(x, y)+F(f1(x, y))\times(f1(x, y)-fus(x, y)) \quad (32)$$

As described above, according to the fourth embodiment, the function F( ) for controlling processing effects depends upon the density value f1(x, y) of the second image, and therefore an amplitude of the high frequency component can be changed according to the density value of the second image.

Fifth Embodiment

A fifth embodiment is described below.

This embodiment is expressed by an arithmetic expression (33) or (34) with a pixel value fd(x, y) of a processed image, a pixel value fuso(x, y) of a smoothed image of a first image f0(x, y), a pixel value f1(x, y) of a second image, a pixel value fus(x, y) of a smoothed (low frequency) image of the second image, a function F( ) for controlling processing effects, and coordinates x and y on the image.

$$fd(x, y)=fuso(x, y)+F(f0(x, y))\times(f1(x, y)-fus(x, y)) \quad (33)$$

$$fd(x, y)=f0(x, y)+F(f0(x, y))\times(f1(x, y)-fus(x, y)) \quad (34)$$

As described above, according to the fifth embodiment, the function F( ) for controlling processing effects depends upon the density value f0(x, y) of the first image, and therefore an amplitude of the high frequency component of a converted image can be changed according to the density value of the first image.

Sixth Embodiment

A sixth embodiment is described below.

This embodiment is expressed by an arithmetic expression (35) or (36) with a pixel value fd(x, y) of a processed image, a pixel value fuso(x, y) of a smoothed image of a first image f0(x, y), a pixel value f1(x, y) of a second image, a pixel value fus(x, y) of a smoothed (low frequency) image of the second image, a function F( ) for controlling processing effects, and coordinates x and y on the image.

$$fd(x, y)=fuso(x, y)+F(fus(x, y))\times(f1(x, y)-fus(x, y)) \quad (35)$$

$$fd(x, y)=f0(x, y)+F(fus(x, y))\times(f1(x, y)-fus(x, y)) \quad (36)$$

As described above, according to the sixth embodiment, the function F( ) for controlling processing effects depends upon the density value fus(x, y) of the smoothed (low frequency) image of the second image, and therefore an amplitude of the high frequency component of a converted image can be changed according to the density value of the smoothed (low frequency) image of the second image. Furthermore, there is no influence of the amplitude of the high frequency component of the second image since the amplitude of the high frequency component is adjusted dependently on the density of the smoothed image.

Seventh Embodiment

A seventh embodiment is described below.

This embodiment is expressed by an arithmetic expression (37) or (38) with a pixel value fd(x, y) of a processed image, a pixel value fuso(x, y) of a smoothed image of a first image f0(x, y), a pixel value f1(x, y) of a second image, a pixel value fus(x, y) of a smoothed (low frequency) image of the second image, a function F( ) for controlling processing effects, and coordinates x and y on the image.

$$fd(x, y)=fuso(x, y)+F(fuso(x, y))\times(f1(x, y)-fus(x, y)) \quad (37)$$

$$fd(x, y)=f0(x, y)+F(fuso(x, y))\times(f1(x, y)-fus(x, y)) \quad (38)$$

As described above, according to the seventh embodiment, the function F( ) for controlling processing effects depends upon the density value fuso(x, y) of the smoothed (low frequency) image of the first image, and therefore an amplitude of the high frequency component of a converted image can be changed according to the density value of the smoothed (low frequency) image of the first image. Furthermore, there is no influence of the amplitude of the high frequency component of the first image since the amplitude of the high frequency component is adjusted dependently on the density of the smoothed image.

Eighth Embodiment

Next, the eighth embodiment is described below, with reference to FIGS. 2, 4, and 5 used for the first embodiment.

In FIG. 2, in the same manner as for the first embodiment, f1(x, y) is a density value of a two-dimensional input original image, f0(x, y) is a density value of an output image after a two-dimensional gradation conversion, and characters x, y indicate two-dimensional coordinates. In addition, an abscissa axis indicates a density value f1(x, y) of the input image and an ordinate axis indicates a density value f0(x, y) of the output image. In this gradation conversion curve, a slope of a 2,500 or lower input density value is 0.2 and a slope of an input density value more than 2,500 is 1.

In FIG. 4, a solid line indicates a profile f0(X9) of an output image after the gradation conversion and a dotted line indicates a profile fuso(X) of a smoothed (low frequency) image.

In FIG. 5, a solid line indicates a profile f1(X) of an input image and a dotted line indicates a profile fd(X) of the processed image as a result of an image processing method according to this embodiment.

Next, the operation is described.

First, an input image f1(x, y) is converted in its gradation with a gradation conversion function F1( ) shown in FIG. 2 as shown in the above formula (14) to obtain an output image f0(x, y).

Then, a pixel value fd(x, y) of the processed image is obtained on the basis of the following formula (39), supposing that c(x, y) is a function representing a slope of the gradation conversion curve as expressed by the above formula (28):

$$fd(x, y)=fuso(x, y)+a\times(1/c(x, y))\times(f0(x, y)-fuso(x, y)) \quad (39)$$

where a is a constant and fuso(x, y) is a pixel value of the smoothed (low frequency) image of the output image f0(x, y), expressed by the above formulas (16) to (20).

In the gradation conversion curve F1( ) (FIG. 2) used in this embodiment, an amplitude of the high frequency component having a 2,500 or lower density value of the output image (converted image) f0(x, y) is compressed to 20%, while the high frequency component preserves an amplitude of the input image if the density value is more than 2,500 (indicated by a solid line in FIG. 4).

In the same manner as for the first embodiment, both of an average density based on the above formula (30) and the above morphological filter, for example, can be used for the smoothed image.

A profile of the obtained processed image fd(x, Y) is indicated by a dotted line in FIG. 5. A density distribution range of 2,500 or lower density values is compressed to 20% and the high frequency component preserves an amplitude of the input image.

Referring to FIG. 11, there is shown a constitution of the image processing device according to this embodiment, which realizes the above formula (39).

In FIG. 11, an input image f1 is converted in its gradation by a gradation converting unit 801 and a converted image f0 is obtained. The converted image f0 is sent to a subtraction unit 805 and smoothed by a smoothing unit 802 to obtain a smoothed image fuso. The smoothed image fuso is sent to an addition unit 803.

On the other hand, the subtraction unit 805 subtracts the smoothed image fuso from the above converted image f0 to obtain a high frequency component. The high frequency component is subjected to a constant multiplication by a multiplication unit 806 and to an addition to the above smoothed image fuso by the addition unit 803, by which a processed image fd is obtained.

As described above, according to the eighth embodiment, it becomes possible to compress or expand a density distribution range of an arbitrary gradation area of the input image and to keep an amplitude of the high frequency component after the gradation conversion at the same amplitude of the high frequency component of the image before the gradation conversion. Furthermore, there are effects that it does not cause any overshoots nor undershoots and that a calculation time is reduced if a density average is used for the smoothed image.

Ninth Embodiment

Referring to FIG. 12, there is shown a constitution of an image processing device according to a ninth embodiment.

In FIG. 12, there are shown an input image 900 as an original image, a gradation converting unit 901 for converting a gradation of the original image 900, a converted image 902 after the gradation conversion, a fine coefficient storing unit 903 for storing a fine coefficient of a gradation conversion curve used for the gradation converting unit 901, a smoothing image preparation unit 904 for preparing a smoothed image (low frequency image) 905 of the above converted image 902, a high frequency component preparation unit 906 for calculating a difference between the converted image 902 and the smoothed image 905, and a high frequency component adding unit 907 for adding the high frequency component prepared by the high frequency preparation unit 906 to the converted image 902 on the basis of the fine coefficient of the gradation conversion curve stored in the fine coefficient storing unit 903.

Figure 13:
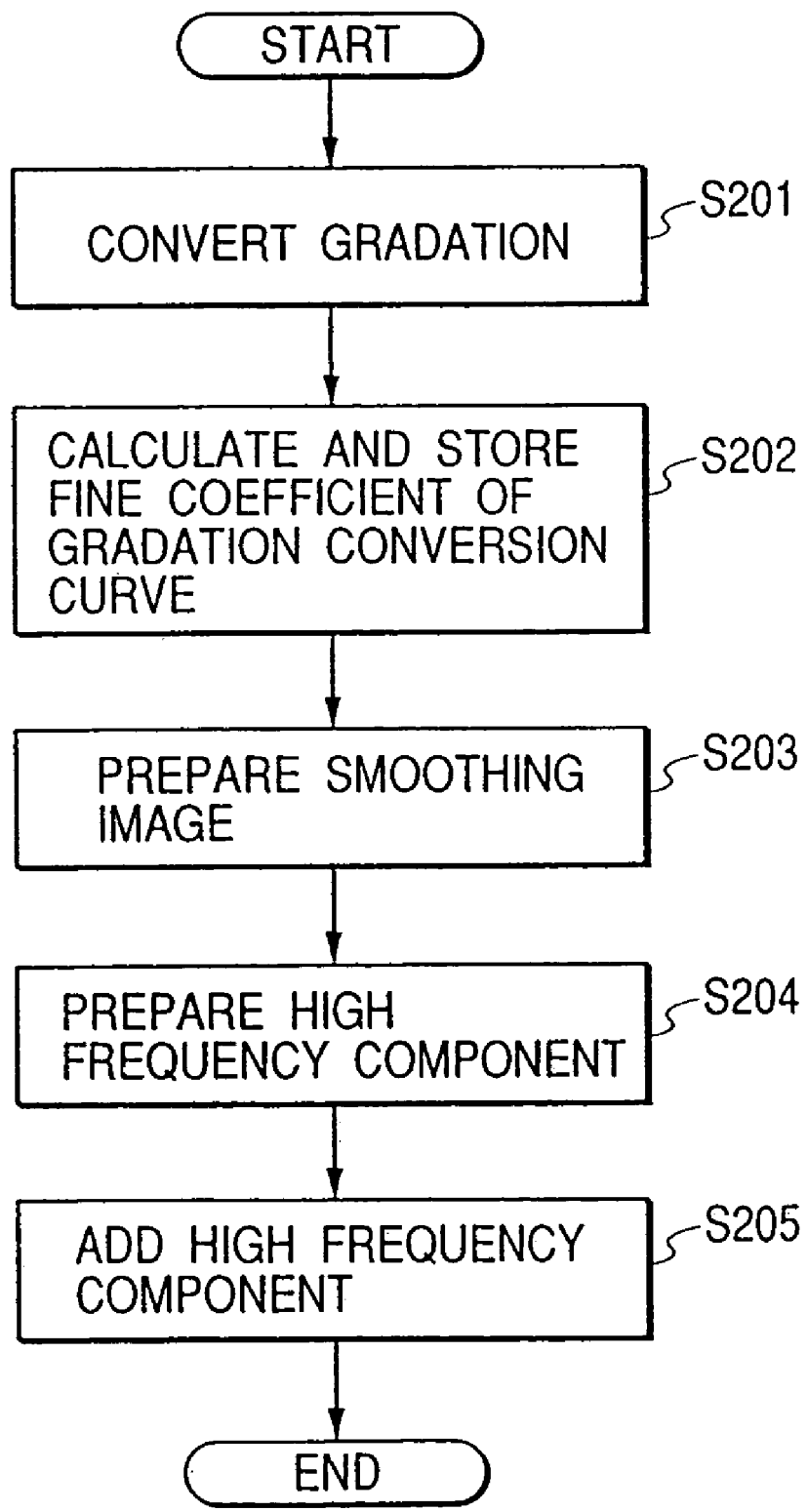
FIG. 13 is a flowchart of a processing according to the ninth embodiment.
Figure 14:
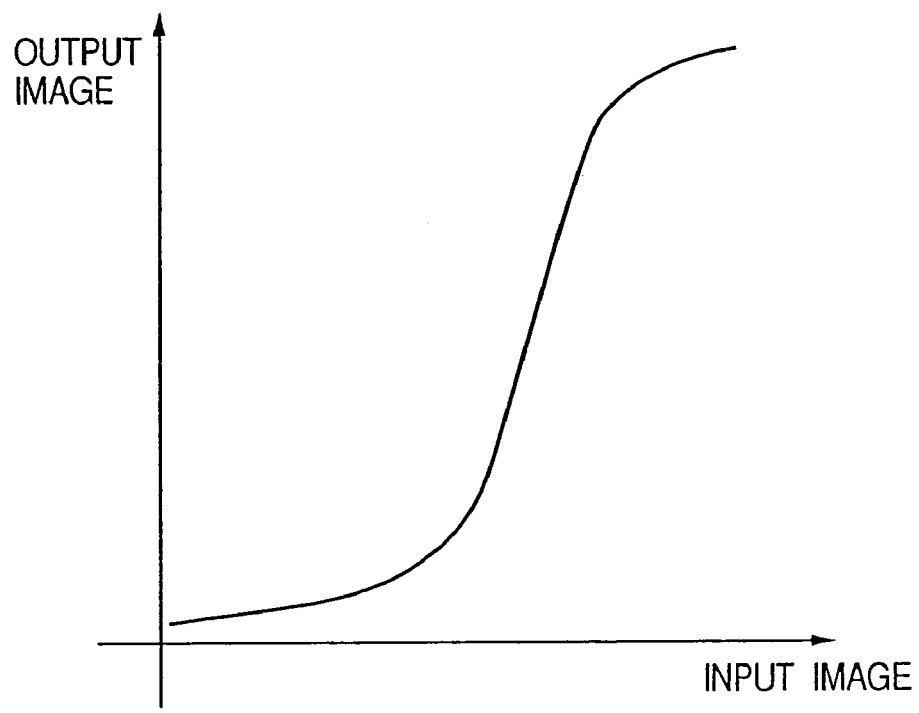
FIG. 14 is a characteristic diagram showing a gradation conversion function F1( ) according to the ninth embodiment.
Figure 15:
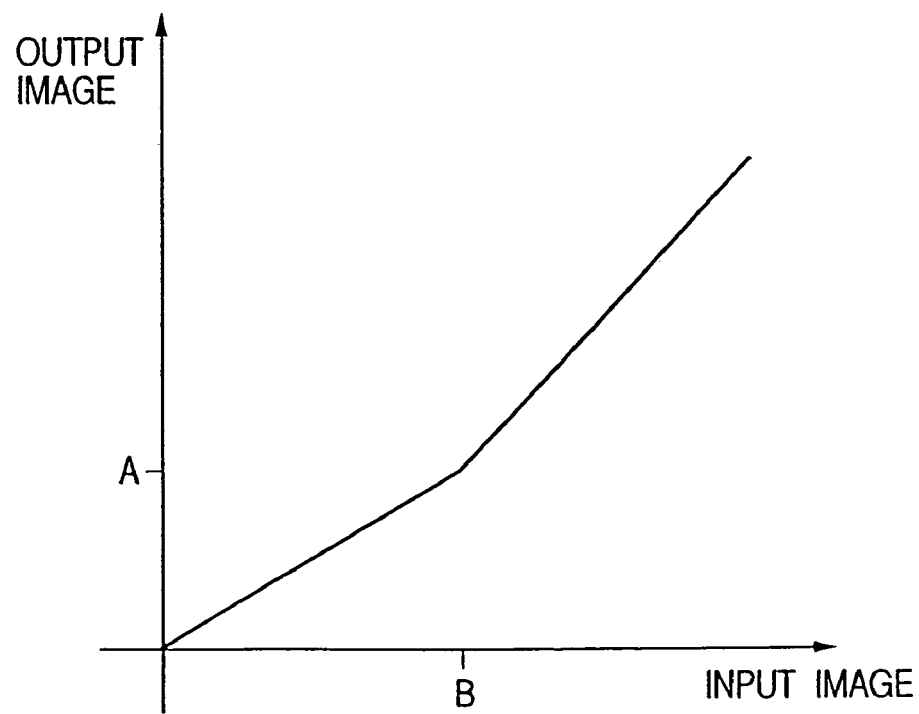
FIG. 15 is a characteristic diagram showing a gradation conversion function F1( ) according to the ninth embodiment.

Referring to FIG. 13, there is shown a flowchart showing a processing flow of this embodiment. FIGS. 14 and 15 show gradation conversion curves used for the gradation converting unit 901, in which an abscissa axis indicates pixel values of an input image and an ordinate axis indicates pixel value of an output image. FIG. 14 shows an S-shaped gradation conversion curve and FIG. 15 shows a curve having slope A/B for B or lower input density values and slope 1 for input density values more than B.

Next, an operation is described below along the processing flow shown in FIG. 13.

The gradation converting unit 901 converts the gradation of the original image 900 on the basis of the gradation conversion curves shown in FIGS. 14 and 15, for example, as expressed by a formula (40) (Step S201). In this formula, f1(x, y) is a density value of the two-dimensional input original image 900, f0(x, y) is a density value of the two-dimensional converted image 902 after the gradation conversion, and F1( ) is the gradation conversion curve. Characters x, y indicate two-dimensional coordinates.

$$f0(x, y)=F1(f1(x, y)) \quad (40)$$

The fine coefficient storing unit 903 calculates a fine coefficient of the gradation conversion curve expressed by a formula (41) and stores the density value as a table c(x) (S202).

$$c(x)=1-[\partial F1(x)/\partial x] \quad (41)$$

Next, in the smoothing image preparation unit 904, the smoothed image 905 is calculated from the image 902 on the basis of the above formula (30) (S203).

Subsequently, the high frequency component preparation unit 906 calculates a high frequency image from the gradation converted image 902 and the smoothed image 905 as expressed by the formula (42) (S204):

$$fh(x, y)=f0(x, y)-fus(x, y) \quad (42)$$

where fh(x, y) is a pixel value of a high frequency image.

The high frequency component adding unit 907 adds the high frequency component calculated by the high frequency component preparation unit 906 to the converted image 902 after the gradation conversion on the basis of the fine coefficient stored by the fine coefficient storing unit 903 as expressed by the following formula (43) to obtain a processed image fd(x, y) (S205):

$$fd(x, y)=f0(x, y)+a\times c(f0(x, y))\times fh(x, y) \quad (43)$$

where a is a constant.

The smoothed image 905 can also be calculated with the above formulas (16) to (20) by using a morphological operation.

The obtained profile of fus(x, y) preserves an edge structure and does not cause overshoots nor undershoots which are disadvantages of the conventional dynamic range compression.

According to this embodiment, it becomes possible to compress or expand a density distribution range of an arbitrary gradation area of the input image and to keep the amplitude of the high frequency component after the gradation conversion at the same amplitude of the high frequency component of the image before the gradation conversion. Furthermore, there are effects that it does not cause any overshoots nor undershoots and that a calculation time is reduced if a density average is used for the smoothed image.

Tenth Embodiment

A tenth embodiment will be described below by using accompanying drawings.

Figure 16:
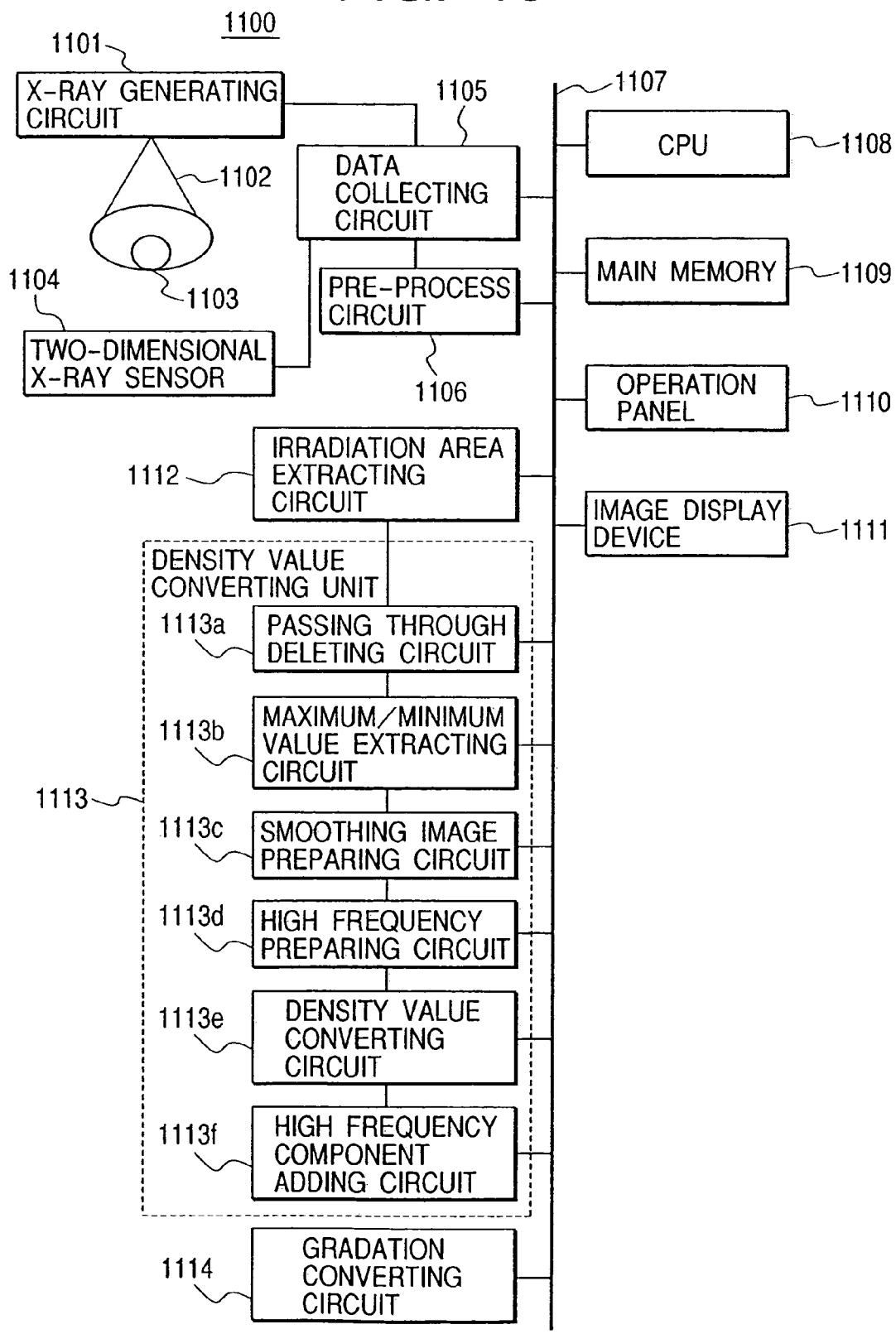
FIG. 16 is a block diagram of a constitution of an image processing device according to a tenth embodiment.

Referring to FIG. 16, there is shown an image processing device 1100 according to this embodiment of the invention.

The image processing device 1100 is an image processing device of an X-ray image having a density value converting function, comprising a pre-process circuit 1106, a density value converting unit 1113, a CPU 1108, a main memory 1109, an operation panel, and an image display device 1111, among which data is sent or received each other via a CPU bus 1107.

In addition, the image processing device 1100 has a data collecting circuit 1105 connected to the pre-process circuit 1106 and a two-dimensional X-ray sensor 1104 and an X-ray generating circuit 1101 connected to the data collecting circuit 1105, and these circuits are also connected to the CPU bus 1107.

Referring to FIG. 2, there is shown a flowchart showing a processing flow of the image processing device.

Figure 18A:
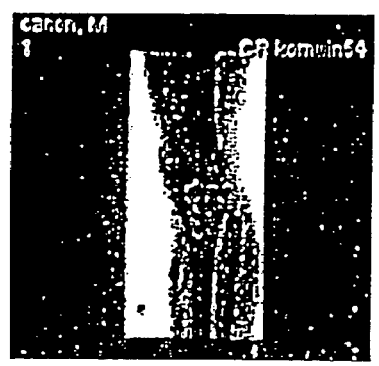
FIGS. 18A and 18B are configurational diagrams of an image from which an irradiation area and a passing through area are deleted.
Figure 18B:
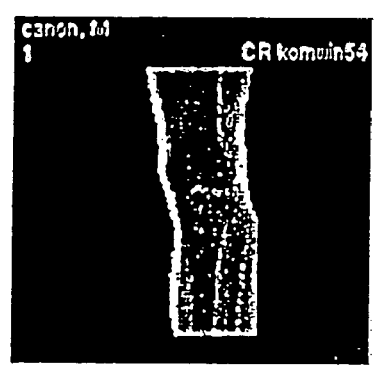

FIG. 18A shows an input image and FIG. 18B is a diagram as a result of deleting an X-ray irradiation area and a passing through area (an area through which an X-ray has passed) from the input image.

Figure 19:
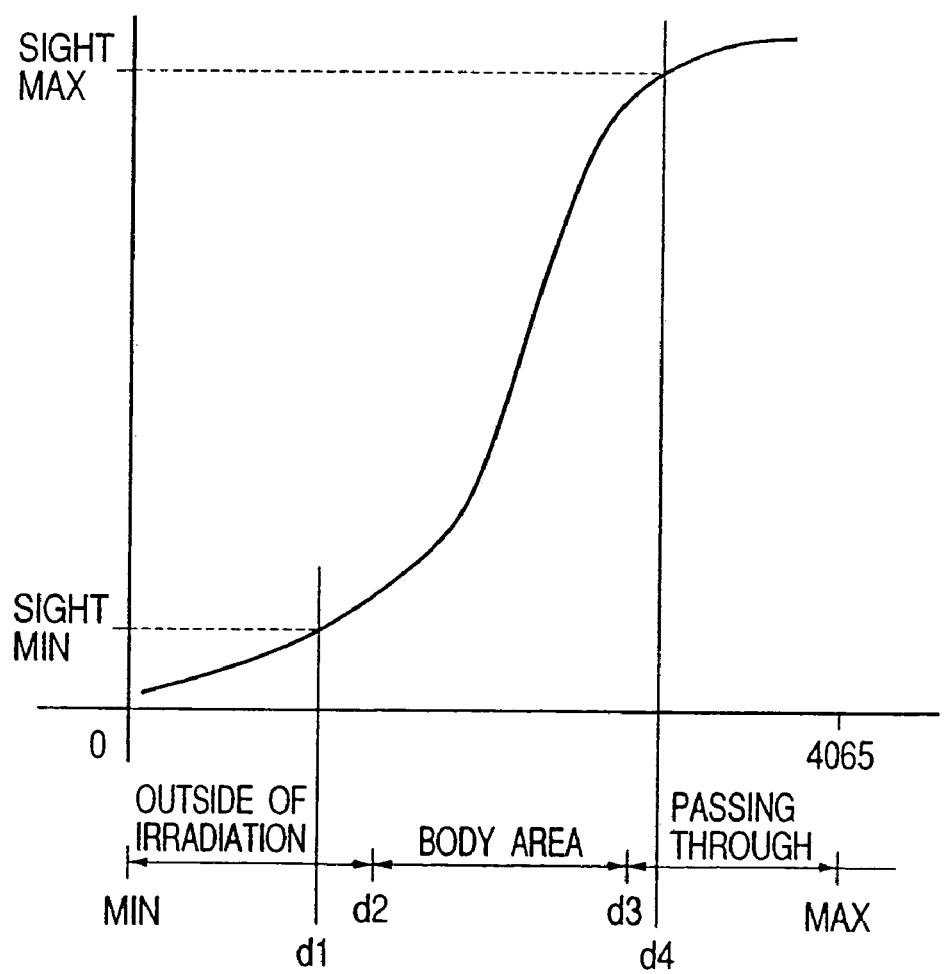
FIG. 19 is a characteristic diagram of assistance in explaining the operation of the invention according to the tenth embodiment.

FIG. 19 is a diagram showing a relationship between a density area which is visible on a gradation conversion curve and a density area of a noted area, in which an abscissa axis indicates density values of an input image and an ordinate axis indicates density values of an output image.

In the image processing device 1100 having the above constitution, the main memory 1109 is used to store various data required for processing of the CPU 1108 and contains a work memory for works of the CPU 1108. The CPU 1108 controls an operation of the entire device following an operation from the operation panel 1110 by using the main memory 1109. Accordingly, the image processing device 1100 operates as described below.

First, an examined object 1103 is irradiated with an X-ray beam 1102 from the X-ray generating circuit 1101. The X-ray beam 1102 passes through the examined object 1103 with being damped and reaches the two-dimensional X-ray sensor 1104 to be output as an X-ray image from the two-dimensional X-ray sensor 1104. In this embodiment, the X-ray image output from the two-dimensional X-ray sensor 1104 is assumed to be a knee or thoracic vertebra image as shown in FIG. 18A, for example.

The data collecting circuit 1105 converts the X-ray image output from the two-dimensional X-ray sensor 1104 to electric signals to supply them to the pre-process circuit 1106. The pre-process circuit 1106 performs preprocessing such as offset correcting processing or gain correcting processing for the signals (X-ray image signals) from the data collecting circuit 1105. The pre-processed X-ray image signals are transferred as an input image to the main memory 1109, an irradiation area extracting circuit 1112, and a passing through deleting circuit 1113a of the density value converting unit 1113 via the CPU bus 1107 under a control of the CPU 1108.

In the density value converting unit 1113, there are the passing through deleting circuit 1113a for deleting a passing through area and a body area in contact with the passing through area within a fixed space, a maximum/minimum value extracting circuit 1113b for calculating the maximum and minimum values of the density value from an area which has not been deleted by the passing through deleting circuit 1113a, a smoothing image preparing circuit 1113c for preparing a smoothed image of the input image, a high frequency component preparing circuit 1113d for preparing a high frequency component on the basis of the difference between the input image and the smoothed image, a density value converting circuit 1113e for converting the density value of the smoothed image on the basis of the maximum and minimum values extracted by the maximum/minimum value extracting circuit 1113b, and a high frequency component adding circuit 1113f for adding the high frequency component prepared by the high frequency component preparing circuit 1113d to the image converted by the density value converting circuit 1113e.

Figure 17:
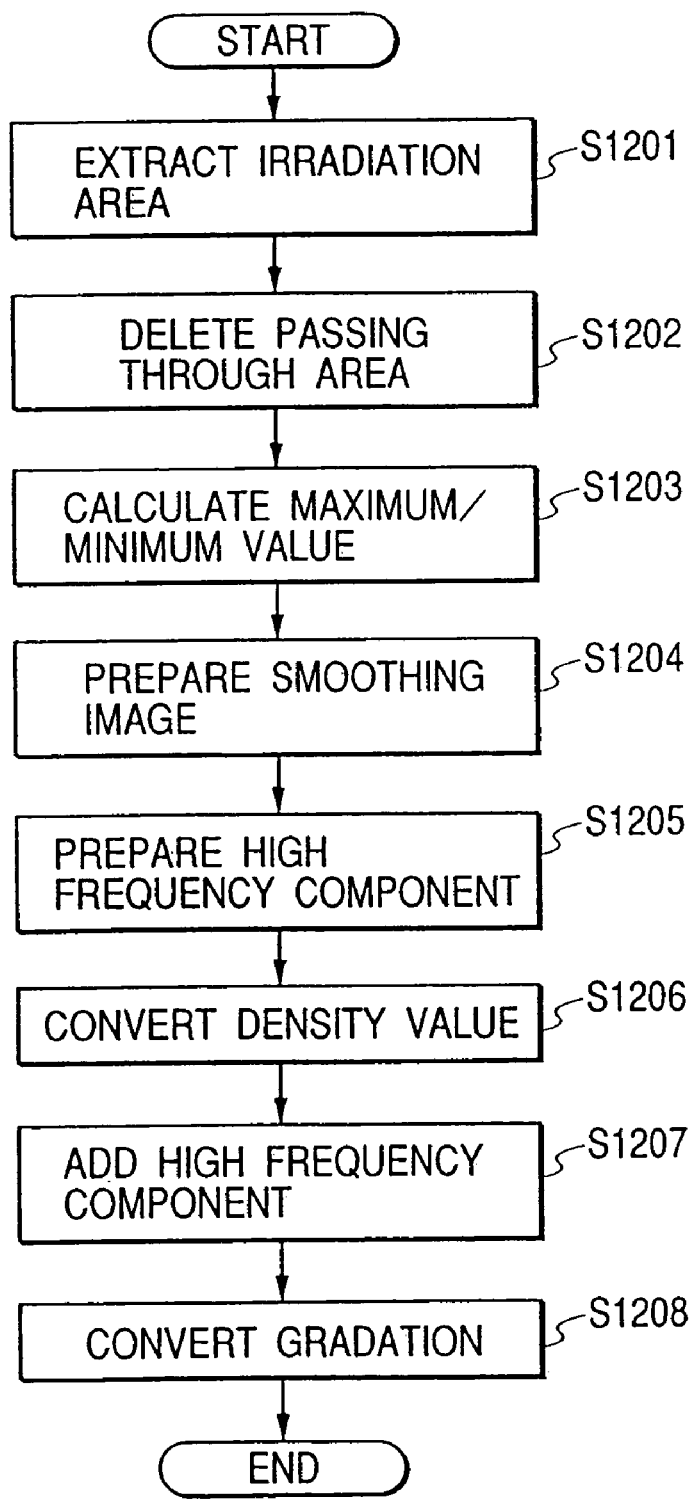
FIG. 17 is a flowchart of a processing procedure according to the tenth embodiment.

Subsequently, the operation of the density value converting unit 1113 is described below by using the flowchart in FIG. 17.

The irradiation area extracting circuit 1112 receives an input image processed by the pre-process circuit 1106 via the CPU bus 1107 under the control of the CPU 1108 and extracts an irradiation area in the input image (Step S1201). On the other hand, the passing through deleting circuit 1113a which has received the input image replaces a passing through area outside and inside the irradiation area and a body area which is in contact with the passing through area within a fixed space with 0 pixels, for example (Step S1202). Specifically, the image is converted as follows.

$$f1(x, y) = f(x, y) X \prod_{x1=-d1}^{x1=d1} \prod_{y1=-d2}^{y1=d2} \mathrm{sgn}(x + x1, y + y1) \quad (112)$$

where f(x, y) is image data and f1(x, y) is an image as a result of deleting the passing through area and the body area in contact with the passing through area within a fixed space. Sgn(x, y) is expressed by the following formula (113):

$$\text{If } sgn(x, y)=0 \text{ and } f(x, y) \geq Th1, sgn(x, y)=1, \text{ etc.} \quad (113)$$

where Th1 is a constant determined by an experiment and d1 and d2 are constants for determining a width by which a body area is deleted.

FIG. 18B shows an image obtained by replacing an area outside the irradiation area of the input image and the passing through area with zero (0).

Next, the maximum/minimum value extracting circuit 1113b calculates the maximum value (d2 in FIG. 19) and the minimum value (d3 in FIG. 19) of the image density value (Step S1203). In calculating the maximum value and the minimum value, the values can also be extracted from the smoothed image of an area after the irradiation area and the passing through area are deleted. Subsequently the smoothing image preparing circuit 1113c prepares a smoothed image on the basis of the following formula (Step S1204), supposing that fus(x, y) is a pixel value of a smoothed (low frequency) image of the input image f0(x, y), which is expressed by the formulas (114) to (118) or a formula (119), for example:

$$f2(x, y) = \min\{f0(x+x1, y+y1) - D(x1, y1) | x1 \times x1 + y1 \times y1 \leq r1 \times r1\} \quad (114)$$

$$f3(x, y) = \max\{f2(x+x1, y+y1) + D(x1, y1) | x1 \times x1 + y1 \times y1 \leq r1 \times r1\} \quad (115)$$

$$f4(x, y) = \max\{f3(x+x1, y+y1) + D(x1, y1) | x1 \times x1 + y1 \times y1 \leq r1 \times r1\} \quad (116)$$

$$fus(x, y) = \min\{f4(x+x1, y+y1) - D(x1, y1) | x1 \times x1 + y1 \times y1 \leq r1 \times r1\} \quad (117)$$

where D(x, y) indicates a disc filter and r1 indicates an arbitrary constant, selected according to the input image.

$$D(x, y) = 0, \; x \times x + y \times y \leq r1 \times r1 \quad (118)$$
$$= -\infty, \text{ etc.}$$

A profile of fus(x, y) obtained here preserves an edge structure, by which it does not cause overshoots nor undershoots which are disadvantages of the conventional dynamic range compression.

For the smoothed image, it is possible to use both of an average density expressed by the formula (117), for example, and the following formula:

$$fus(x, y) = \frac{\int_{-d}^{d}\int_{-d}^{d} f1(x+x1, y+y1) dx1\, dy1}{\int_{-d}^{d}\int_{-d}^{d} dx1\, dy1} \quad (119)$$

where d indicates a constant.

In addition, it is also possible to prepare a smoothed image by using an erosion, dilation, opening, or closing morphological filter, for example.

Subsequently, the high frequency component preparing circuit 1113c prepares a high frequency image fh(x, y) on the basis of the formula described below from the input image f0(x, y) and the smoothed image fus(x, y) (Step S205). Then, the density value converting circuit 1113e converts the density value by the formula described below on the basis of the maximum value (d3) and the minimum value (d2) extracted by the maximum/minimum value extracting circuit 1113b and density values d1 and d4 determined by a visible density value after a gradation conversion to prepare a smoothed image Sus0x(x, y) as a result of converting the density value (Step S1206).

In FIG. 19, Sightmax and Sightmin indicate the visible maximum and minimum density values corresponding to d4 and d1, respectively. If the density value of the smoothed image is within a range of min (the minimum value which can be obtained in the smoothed image) to d1, $$Susu0(x, y) = (d1 - \min) \times ((Sus(x, y)) - \min)/(d2 - \min) + \min \quad (120)$$

If $d2 < Sus(x, y) \leq d3$, $Susu0(x, y) = (d4 - d1) \times (Sus(x, y) - d2)/(d3 - d2) + d1$ \quad (121)

If $d3 < Sus(x, y) \leq \max$, $Susu0(x, y) = (\max - d4) \times (Sus(x, y) - d3)/(\max - d3) + d4$ \quad (122)

Then, the high frequency image fh(x, y) is added to the density-value converted image Susuo(x, y) to obtain a final image fe(x, y) (Step S1207).

$$fe(x,y) = Susu0(x, y) + fh(x, y) \quad (123)$$

Finally, the obtained image fe(x, y) is converted in its gradation by the gradation converting circuit 1114 and it is output as a film output or displayed on an image display device 1111.

Although an operation for an image having a passing through area has been described in this embodiment, the maximum value and the minimum value can be extracted by the maximum/minimum value extracting circuit 1113b from an image within an irradiation area bypassing the passing through deleting circuit 1113a if there is no passing through area.

According to this embodiment, it is possible to compress or expand an image in a noted area to a fixed range with preserving a high frequency component and to use image information effectively. Furthermore, assuming that the above fixed range is a visible area on a film, a noted area can be expanded or compressed to a size of the visible area on the film. In addition, in extracting the maximum value or the minimum value form a smoothed image, there is an effect that the conversion with the density value converting unit 1113 can be performed more precisely.

Eleventh Embodiment

Figure 20:
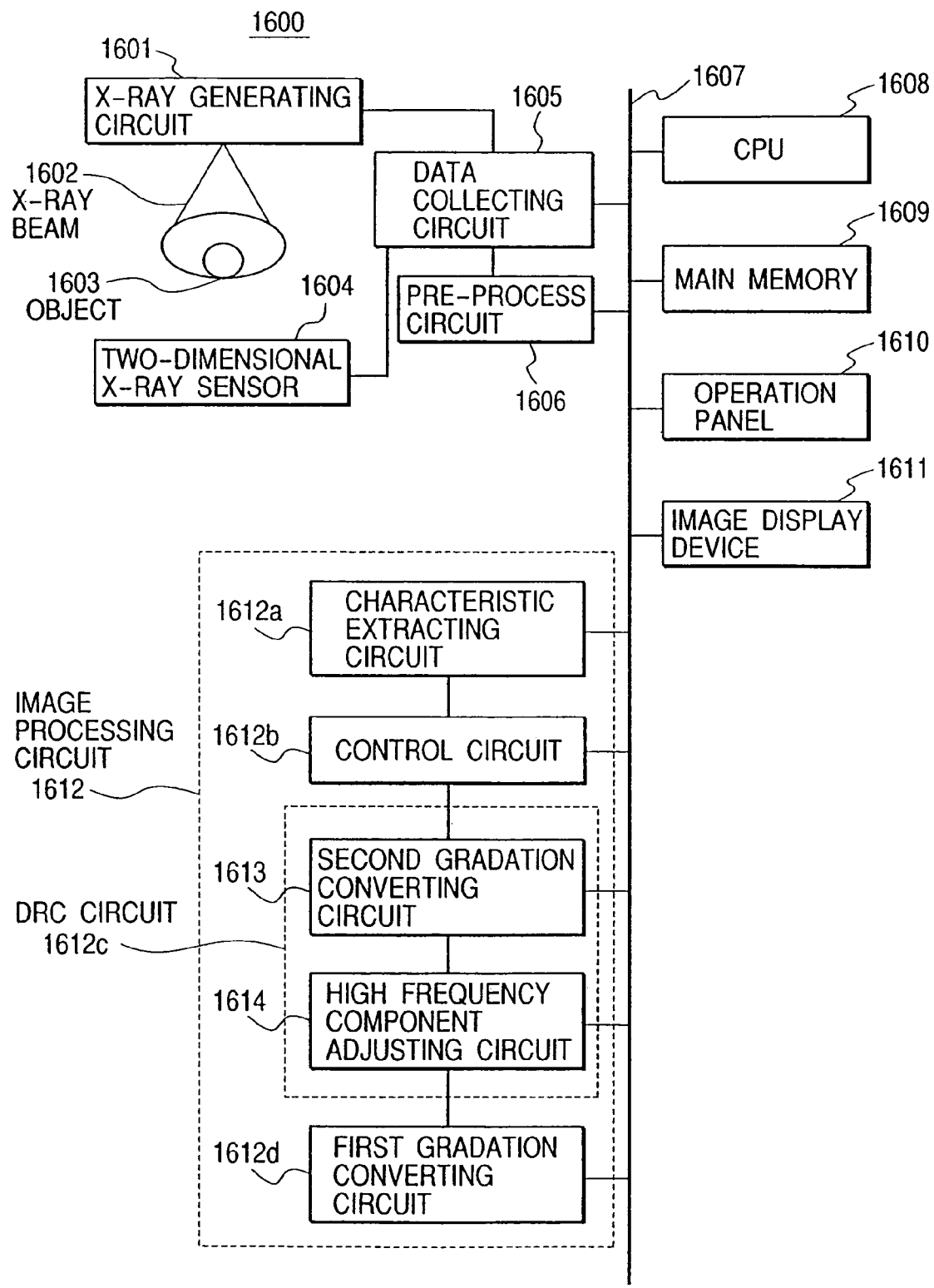
FIG. 20 is a diagram of a constitution of an image processing device according to an 11th embodiment.

Referring to FIG. 20, there is shown a constitution of an X-ray phototaking device 1600 to which an image processing device is applied according to an Eleventh embodiment. The X-ray phototaking device 1600, which has an image processing function, comprises a pre-process circuit 1606, a CPU 1608, a main memory 1609, an operation panel 1610, an image display device 1611, and an image processing circuit 1612, among which data is sent or received each other via a CPU bus 1607.

In addition, the image processing device 1600 has a data collecting circuit 1605 connected to the pre-process circuit 1606 and a two-dimensional X-ray sensor 1604 and an X-ray generating circuit 1601 connected to the data collecting circuit 1605, and these circuits are also connected to the CPU bus 1607.

In this diagram, there are a characteristic extracting circuit 1612a for calculating a characteristic amount for a gradation conversion, a control circuit 1612b for calculating a range and a change amount of changing a dynamic range on the basis of a gradation conversion curve of a first gradation converting circuit, and a DRC circuit 1612c for changing a dynamic range of an original image on the basis of the range and the change amount of changing the dynamic range calculated by the control circuit 1612b. The DRC circuit 1612c comprises a second gradation converting circuit 1613 for converting a gradation of the original image and a high frequency component adjusting circuit for adding a high frequency component of the original image to the image whose gradation has been converted by the second gradation converting circuit 1613. A first gradation converting circuit 1612d converts a gradation of the original image whose dynamic range has been changed by the DRC circuit 1612c.

Figure 22:
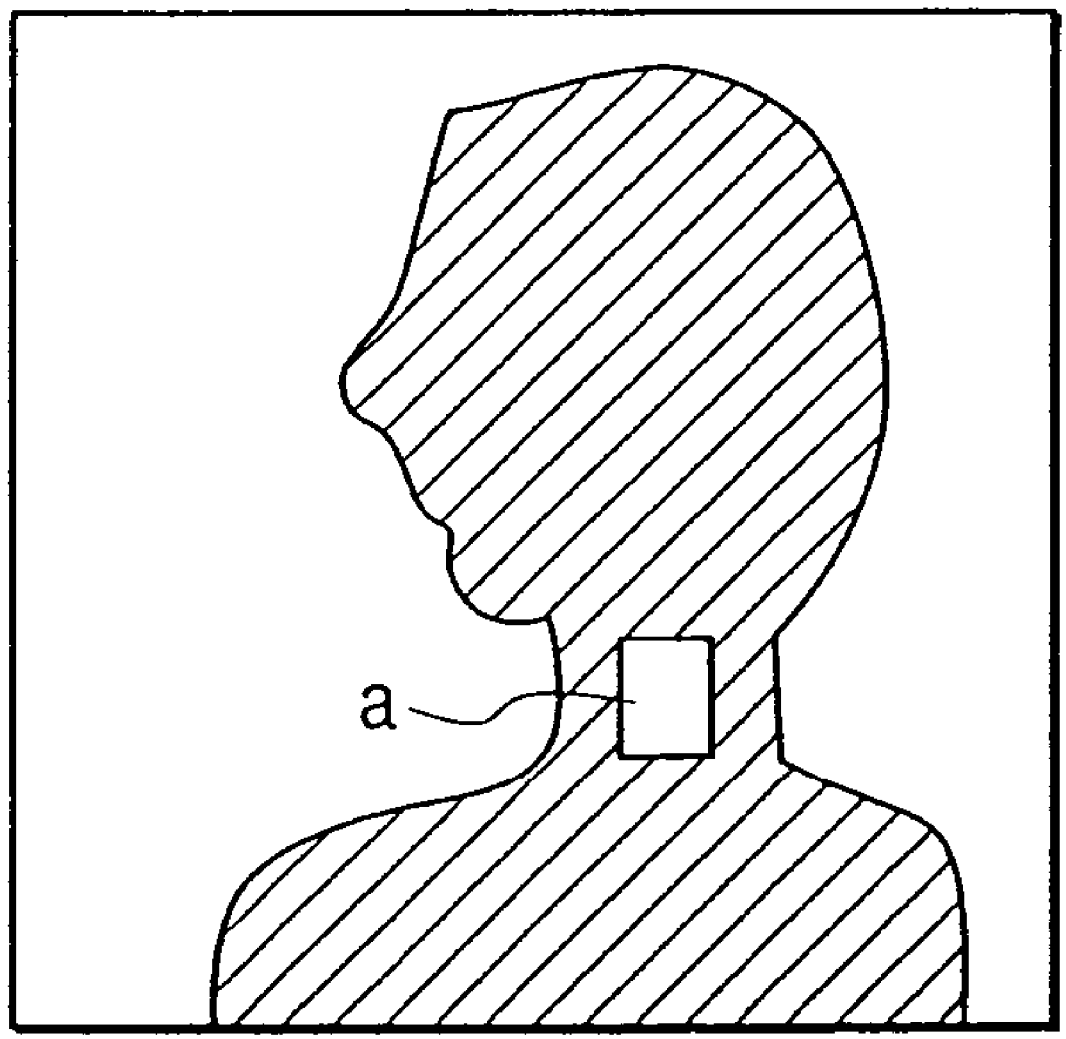
FIG. 22 is a diagram illustrating an area in which a characteristic amount is extracted.

Referring to FIG. 22, there is shown a diagram illustrating an area from which a characteristic is extracted when phototaking the side of cervical vertebrae, for example.

Figure 23:
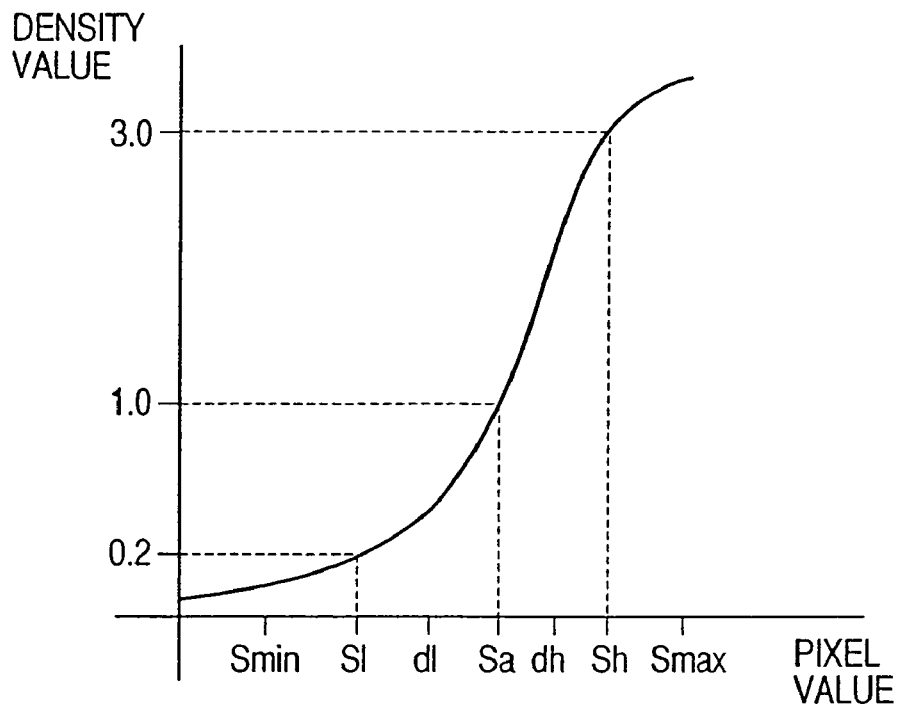
FIG. 23 is a diagram illustrating a gradation conversion curve of a first gradation converting circuit.

Referring to FIG. 23, there is shown a gradation conversion curve of the first gradation converting circuit 1612d, in which an abscissa axis indicates pixel values and an ordinate axis indicates density values. In addition, reference character S1 indicates a pixel value corresponding to a lower limit density value of a visibility limit on a density, reference character Sh indicates a pixel value corresponding to an upper limit density value of the visibility limit on the density, reference characters Smin and Smax indicate the minimum pixel value and the maximum pixel value of a noted area, reference character Sa indicates a pixel value corresponding to a characteristic amount calculated by the characteristic extracting circuit 1612a, and reference characters dl an dh indicate pixel values corresponding to a lower limit density value and an upper limit density value of a range which is not subjected to a change of the dynamic range, respectively.

Figure 24:
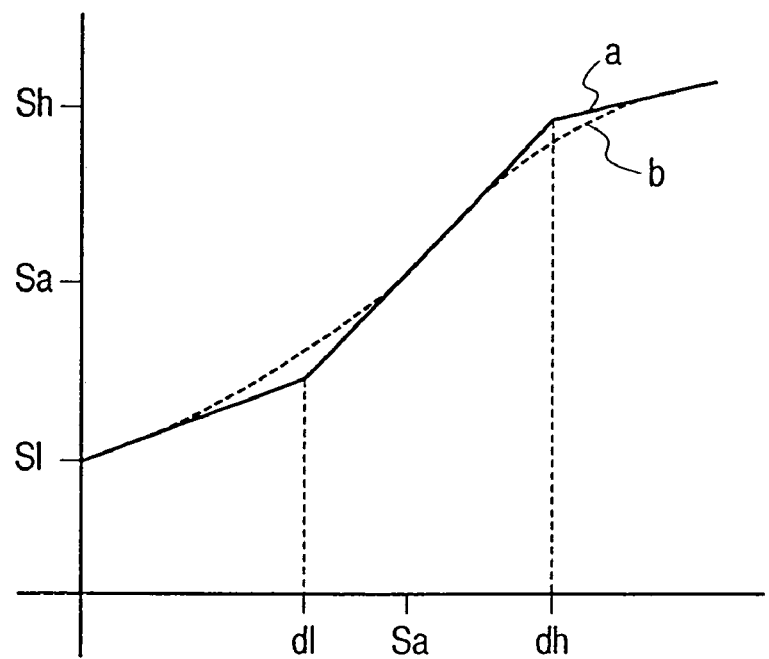
FIG. 24 is a diagram illustrating a gradation conversion curve of a second gradation converting circuit.

Referring to FIG. 24, there is shown a gradation conversion curve of the second gradation converting circuit 1613, in which an abscissa axis indicates input pixel values,.an ordinate axis indicates output pixel values, and dl, dh, and Sa indicate the above pixel values. A gradation conversion curve a is formed only by linear components, while a gradation conversion curve b is formed by a smooth curve so as to obtain continuous differential values of the gradation conversion curve a.

In the above X-ray phototaking device, first the main memory 1609 is used to store various data required for processing in the CPU 1608 and contains a work memory for works of the CPU 1608.

The CPU 1608 controls an operation of the entire device following an operation from the operation panel 1610 by using the main memory 1609. Accordingly, the X-ray phototaking device 1600 operates as described below.

First, an examined object 1603 is irradiated with an X-ray beam 1602 from an X-ray generating circuit 1601. The X-ray beam 1602 from the X-ray generating circuit 1601 passes through the examined object 1603 with being damped and reaches the two-dimensional X-ray sensor 1604 to be output as an X-ray image from the two-dimensional X-ray sensor 1604. The X-ray image output-from the two-dimensional X-ray sensor 1604 is an image of a human body, for example.

The data collecting circuit 1605 converts the X-ray image output from the two-dimensional X-ray sensor 1604 to electric signals to supply them to the pre-process circuit 1606. The pre-process circuit 1606 performs preprocessing such as offset correcting processing or gain correcting processing for the signals (X-ray image signals) from the data collecting circuit 1605. The X-ray image signals pre-processed by the pre-process circuit 1606 are transferred as an input image to the main memory 1609 and an image processing circuit 1612 via the CPU bus 1607 under a control of the CPU 1608.

Figure 21:
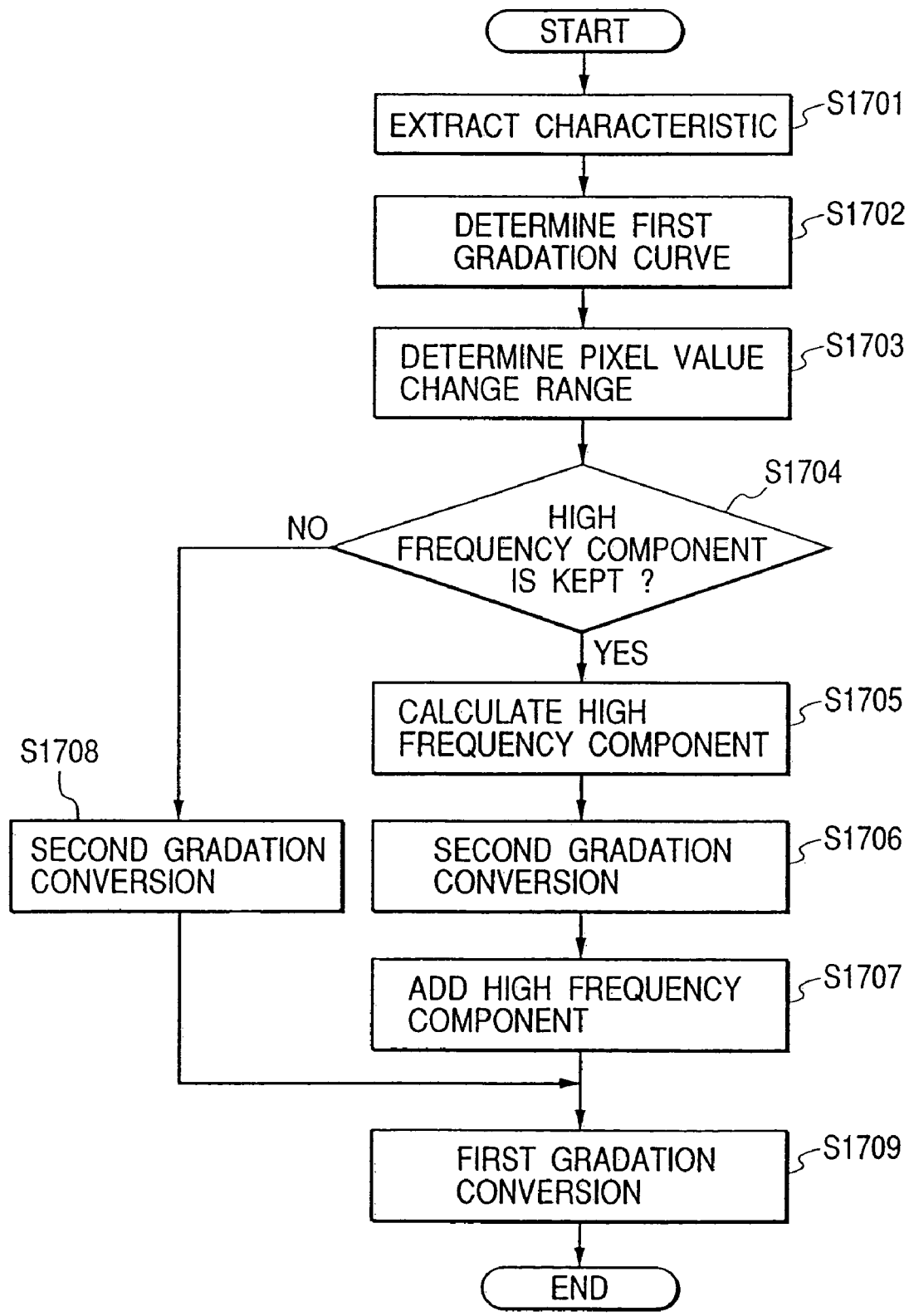
FIG. 21 is a flowchart of a processing procedure of a processing according to an 11th embodiment.

Next, the operation of the image processing circuit 1612 is described below following the processing flowchart in FIG. 21.

The characteristic extracting circuit 1612a receives an original image f0(x, y) processed by the pre-process circuit 1606 via the CPU bus 1607 under the control of the CPU 1608 and calculates a characteristic amount Sa for a gradation conversion (S1701). This characteristic amount calculation method depends upon a region, and a plurality of methods are also applied by an applicant of this invention. In phototaking an image of cervical vertebrae, for example, a method disclosed in the Japanese Patent Application No. 10-272284 is used. In this method, depression information of a neck is used as a characteristic amount Sa to calculate an average value of pixel values from an area a shown in FIG. 22.

Subsequently, a gradation conversion curve with the first gradation converting circuit 1612d is defined by using the characteristic amount Sa. As shown in FIG. 23, for example, a gradation conversion curve is defined so that the pixel value of the characteristic amount Sa is changed to that of a density value 1.0.

Next, the control circuit 1612b calculates a range and a change amount of changing a dynamic range of an original image on the basis of the above defined gradation conversion curve (S1703).

The method is described specifically below. For example, an ordinary Japanese is visible in a range of density values 0.2 to 3.0. On the basis of the above gradation conversion curve, a calculation is made for the pixel values Sl and Sh which are to be converted in the gradation to density values 0.2 and 3.0, respectively. Subsequently, a range in which a dynamic range is not changed is calculated on the basis of the following formulas (124) and (125):

$$dl = Sa - hl \quad (124)$$

$$dh = Sa + hh \quad (125)$$

where hl and hh indicate constants and dl and dh indicate pixel values to be a starting point of changing the dynamic range. Next, a change amount Rl and Rh for dl and lower pixel values and for pixel values greater than dl are calculated on the basis of the following formulas (126) and (127), respectively:

$$Rl = (Sl - dl)/(Smin - dl) \quad (126)$$

$$Rh = (Sh - dh)/(Smax - dh) \quad (127)$$

where Smin and Smax indicate the minimum and maximum values among pixel values in the area of an object for photographing (noted area), respectively. In other words, if a dynamic range of dl and lower pixel values is multiplied by Rl, the pixel value Smin is changed to the pixel value Sl. In the same manner, the pixel value Smax is changed to the pixel value Sh. In other words, supposing that the starting point is dl and dh and that a change amount is Rl and Rh, the density value of the area of an object for photographing after a gradation conversion matches a range of a visible area (a range of the density values 0.2 to 3.0 in the above).

As described above, all of the noted area of the photographed image can be reproduced on an output image by obtaining the values Rl and Rh even if the dynamic range is compressed. Accordingly, an instability in extracting characteristics can be absorbed, by which a diagnostic performance can be improved.

In addition, restrictive conditions can be applied to the change amounts Rl and Rh as expressed by the following formulas (128) and (129):

$$Rl < Cl \quad (128)$$

$$Rh < Ch \quad (129)$$

where Cl and Ch are constants. Values Cl, Ch, hl, and hh are experimentally determined for each region to be photographed.

By providing the restrictive conditions in this manner, an excessive compression can be prevented, by which a diagnostic performance can be prevented from being lowered by the excessive compression.

Subsequently, a gradation conversion curve of the second gradation converting circuit 1713 is prepared as shown in FIG. 24 on the basis of the dl, dh, Rl, and Rh calculated by the control circuit 1712b. A slope of dl and lower pixel values on the gradation conversion curve a is equal to Rl, a slope in a range of pixel values dl to dh is equal to 1, and a slope of pixel values greater than dh is equal to Rh. A gradation conversion curve b is smoothed so as to obtain continuous differential values of the gradation conversion curve a (for example, Japanese Patent Application No. 11-76882 to Shinbata is used). If the gradation conversion curve a is used, a false outline may be generated at discontinuous differential points. If the gradation conversion curve b is used, however, no false outline is generated. In this embodiment, a description will be made below for an operation in using the gradation conversion curve b.

The DRC circuit 1712c selects whether or not the high frequency component is preserved (S1704).

Processing without preserving the high frequency component is effective for diagnosing stem tissues in which a low frequency component is important.

Processing with preserving the high frequency component is effective for diagnosing a bone portion or a lung field in which the high frequency component is important.

The processing selection in S1704 can be performed by an automatic selection on the basis of the photographed region and also can be performed by a manual selection by a user in view of the above characteristics.

Unless the high frequency component is preserved, an original image is converted in the gradation by using the gradation conversion curve b by the second gradation conversion circuit 1713 (S1708). The image after the gradation conversion is converted in the gradation by the first gradation converting circuit 1612d (S1709). Supposing that x and y are coordinates of the original image, f0(x, y) indicates a pixel value of the original image, F(x) indicates a gradation conversion curve b, f1(x, y) indicates a pixel value after the gradation conversion based on the gradation conversion curve b, and F1(x) indicates a gradation conversion curve of the first gradation converting circuit 1612d, a final image f2(x, y) is expressed by the following formula (130):

$$f2(x, y)=F1(F(f0(x, y))) \quad (130)$$

where F1(F(x)) is considered to be a single gradation conversion curve.

Next, a calculation is described below for preserving the high frequency component. First, a high frequency component fh(x, y) of the original image is calculated on the basis of the following formula (131) by the high frequency component adjusting circuit 1614, with the smoothed image fus(x, y) being calculated on the basis of the formula (132):

$$fh(x, y)=f0(x, y)-fus(x, y) \quad (131)$$

where d is a constant indicating a mask size.

$$fus(x, y) = \frac{\int_{-d}^{d}\int_{-d}^{d} f0(x+x1, y+y1) dx1\, dy1}{\int_{-d}^{d}\int_{-d}^{d} dx1\, dy1} \quad (132)$$

Then, the second gradation converting circuit 1613 performs a gradation conversion expressed by the following formula (133):

$$f1(x, y)=F(f0(x, y)) \quad (133)$$

Subsequently, the high frequency component adjusting circuit 1614 calculates a coefficient c(x) from a fine coefficient of the gradation conversion curve b used by the second gradation converting circuit 1613 on the basis of the following formula (134), supposing that the coefficient c(x) is a value equal to 1 minus a slope of the gradation conversion curve:

$$c(x) = 1 - \frac{\partial F(x)}{\partial x} \quad (134)$$

Then, the high frequency component adjusting circuit 1614 adds the high frequency component h(x, y) to the image f1(x, y) on the basis of the coefficient c(x) as expressed by the following formula (135) to obtain a processed image f3(x, y) (S1707):

$$f3(x, y)=f1(x, y)+c(f0(x, y))\times fh(x, y) \quad (135)$$

Subsequently, the first gradation converting circuit 1612d performs a gradation conversion on the basis of the following formula (136) to obtain an image f28(x, y) (S1709):

$$f2(x, y)=F1(f3(x, y)) \quad (136)$$

A smoothed image fus(x, y) can be calculated by a morphological operation as expressed by the following formulas (137) to (141):

$$f2(x, y)=\min\{f0(x+x1, y+y1)-D(x1, y1)|x1\times x1+y1\times y1 \le r1\times r1\} \quad (137)$$

$$f3(x, y)=\max\{f2(x+x1, y+y1)+D(x1, y1)|x1\times x1+y1\times y1 \le r1\times r1\} \quad (138)$$

$$f4(x, y)=\max\{f3(x+x1, y+y1)+D(x1, y1)|x1\times x1+y1\times y1 \le r1\times r1\} \quad (139)$$

$$fus(x, y)=\min\{f4(x+x1, y+y1)-D(x1, y1)|x1\times x1+y1\times y1 \le r1\times r1\} \quad (140)$$

where D(x, y) is a disc filter and r1 is an arbitrary constant, selected according to an input image.

$$\begin{aligned} D(x, y) &= 0, \; x\times x + y\times y \le r1\times r1 \\ &= -\infty, \text{ etc.} \end{aligned} \quad (141)$$

A profile of fus(x, y) obtained here preserves an edge structure, by which it does not cause overshoot nor undershoots which are disadvantages of the conventional dynamic range compression.

According to this embodiment, it becomes possible to compress or expand a density distribution range of an arbitrary gradation area of the input image and to keep an amplitude of the high frequency component after the gradation conversion at the same amplitude of the high frequency component of the image before the gradation conversion. Furthermore, a dynamic range of the image is changed on the basis of the pixel value determined by the gradation conversion curve, and therefore the dynamic range can be changed assuming a density value of the image after the gradation conversion, by which a range of the density value after the gradation conversion can be adjusted uniquely.

In addition, a pixel value depending upon a visibility limit is obtained from the gradation conversion curve and a range and an amount of changing the dynamic range can be determined based on the pixel value, and therefore a range of the density value of the pixel value in the noted area can be put within the visible range. Furthermore, the noted area exists in a visible area, and therefore the entire noted area can be observed, by which a diagnostic performance is increased. Still further, the noted area can be matched with the range of the visible area, by which an information amount of the noted area can be expanded to the maximum as a density value. There is provided a range in which the dynamic range of the image is not changed, and therefore assuming a pixel range important for a diagnosis to be an area in which the dynamic range is not changed, it is represented with density values in the conventional manner and an area which has been invisible conventionally can also be observed with density values, by which the diagnostic performance is increased.

Furthermore, the high frequency component is preserved by the dynamic range changing unit, and therefore an information amount of the high frequency component is not decreased and further it becomes possible to observe density values of an area which have been invisible on the density values, by which the diagnostic performance is increased.

Twelfth Embodiment

Figure 25:
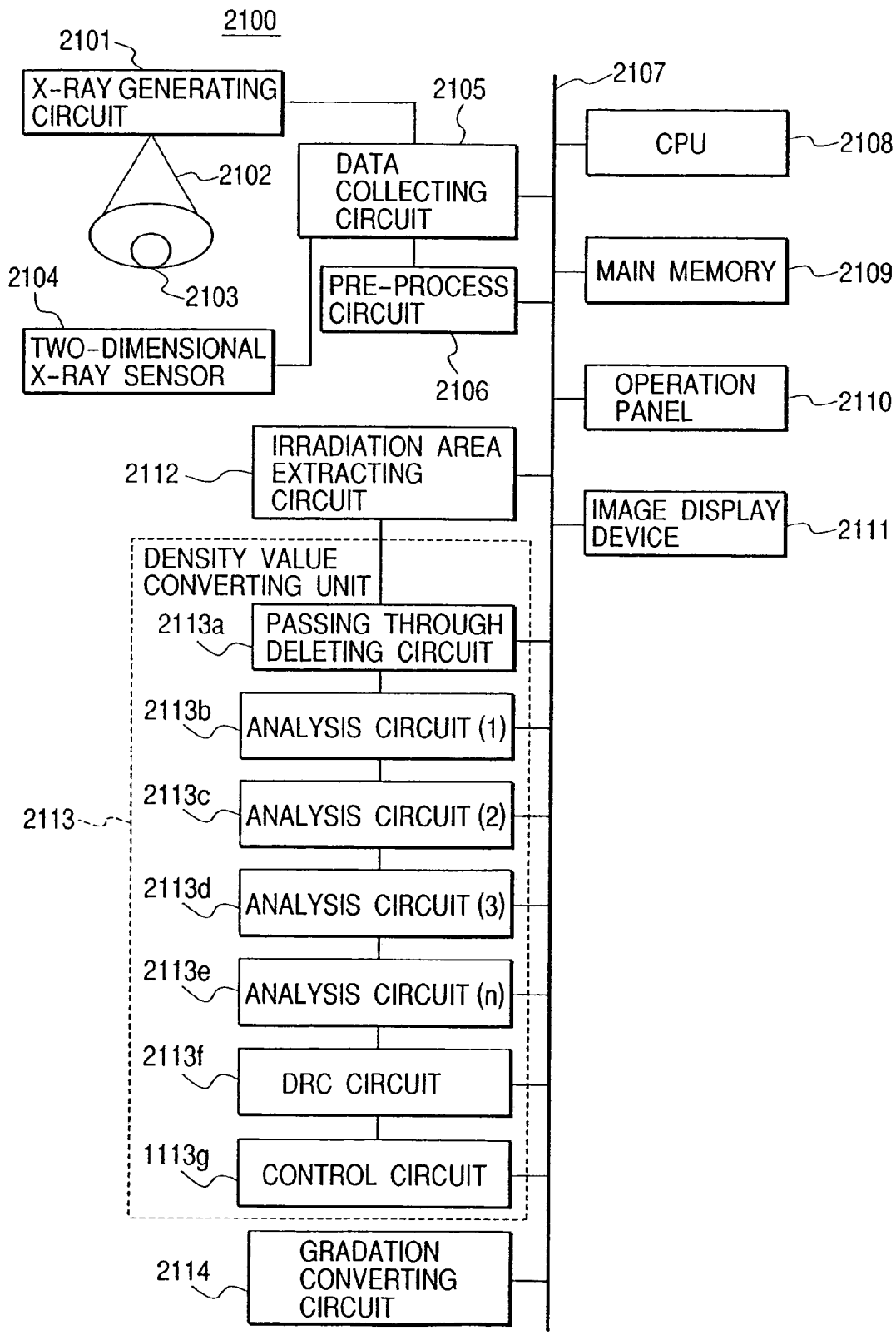
FIG. 25 is a block diagram of the image processing device according to the 12th embodiment.

Referring to FIG. 25, there is shown a constitution of an image processing device 2100 according to a Twelfth embodiment.

The image processing device 2100, which is an X-ray image processing device having a density value converting function, comprises a pre-process circuit 2106, a density value converting circuit 2113, a CPU 2108, a main memory 2109, an operation panel 2110, and an image display device 2111, among which data is sent or received each other via a CPU bus 2107.

The image processing device 2100 also comprises a data collecting circuit 2105 connected to the pre-process circuit 2106 and a two-dimensional X-ray sensor 2104 and an X-ray generating circuit 2101 connected to the data collecting circuit 2105. These circuits are also connected to the CPU bus 2107.

The density value converting circuit 2113 comprises a passing through deleting circuit 2113a, analysis circuits (1) to (n) 2113b to 2113e, a DRC circuit 2113f, and a control circuit 2113g.

Figure 26:
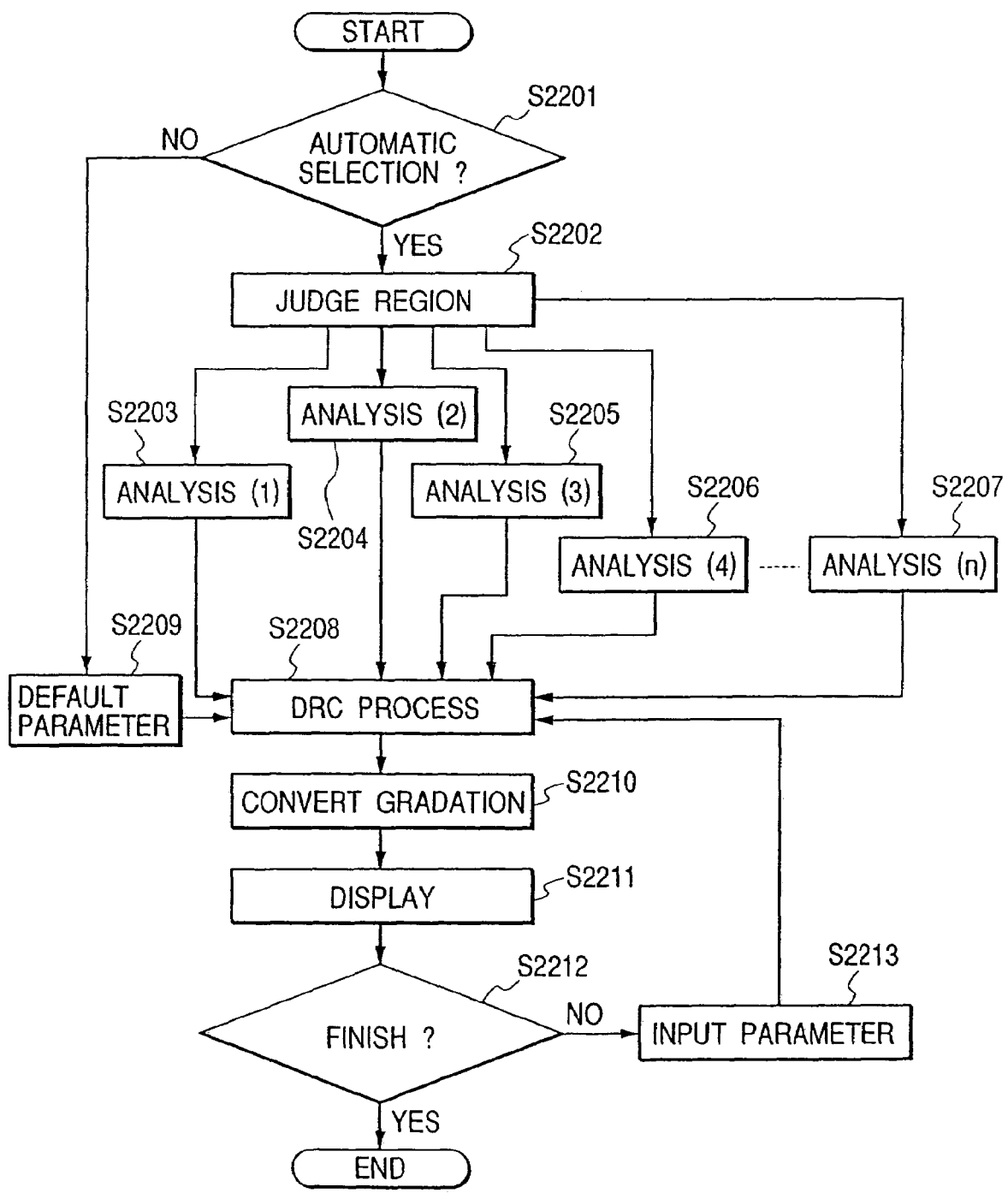
FIG. 26 is a flowchart of a processing according to the 12th embodiment.
Figure 27:
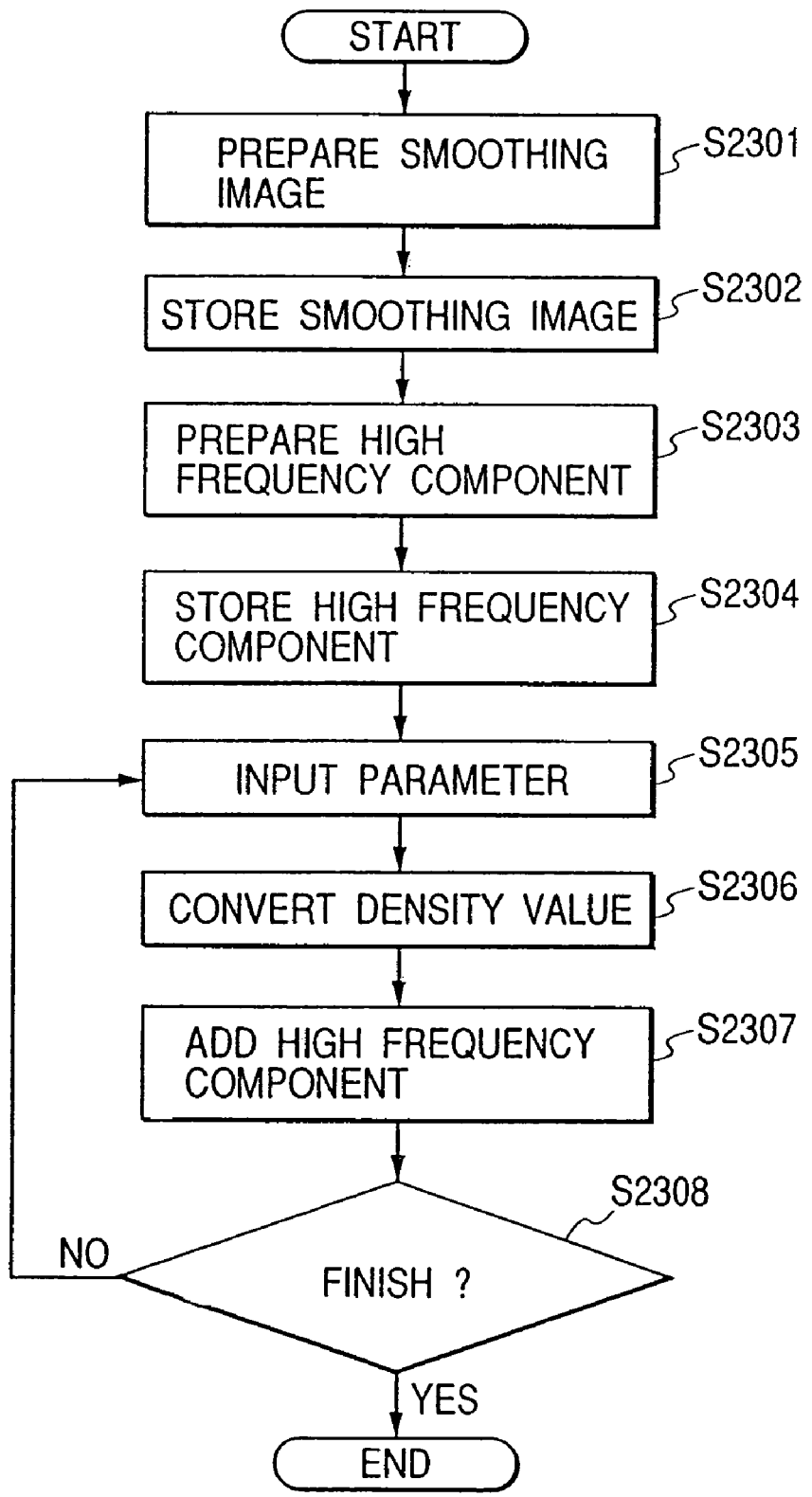
FIG. 27 is a flowchart of a processing of a DRC circuit.
Figure 28:
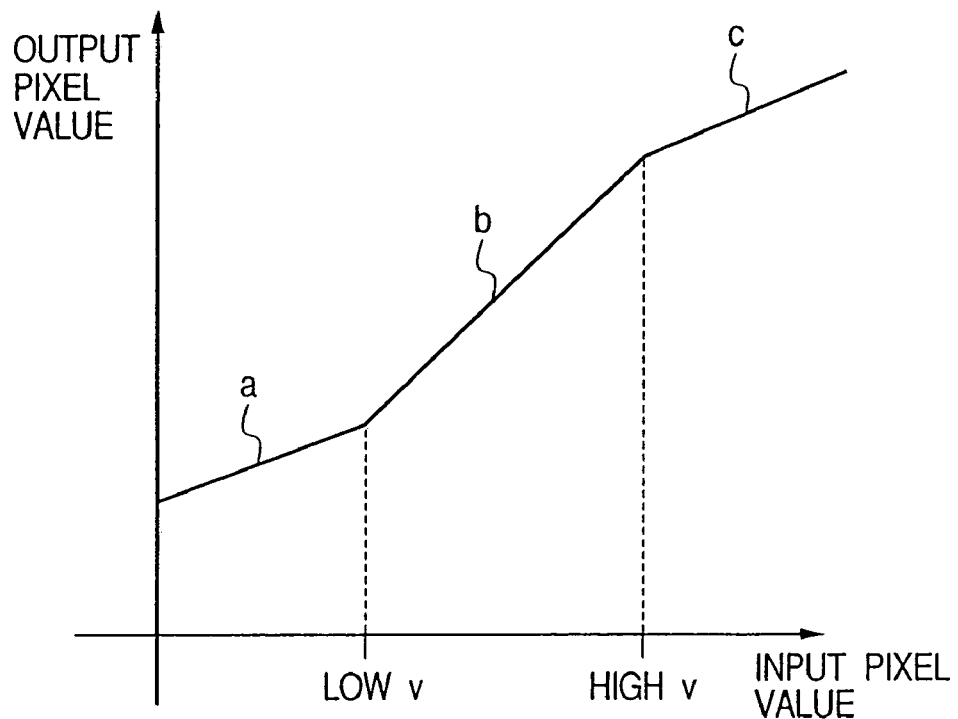
FIG. 28 is a characteristic diagram of a density value conversion curve of the DRC circuit.

Referring to FIG. 26, there is shown a flowchart showing a processing flow of the image processing device according to this embodiment. FIG. 27 shows a flowchart of a processing flow of the dynamic range compression (DRC) circuit and FIG. 28 shows a density value conversion curve used for the DRC circuit.

Figure 29:
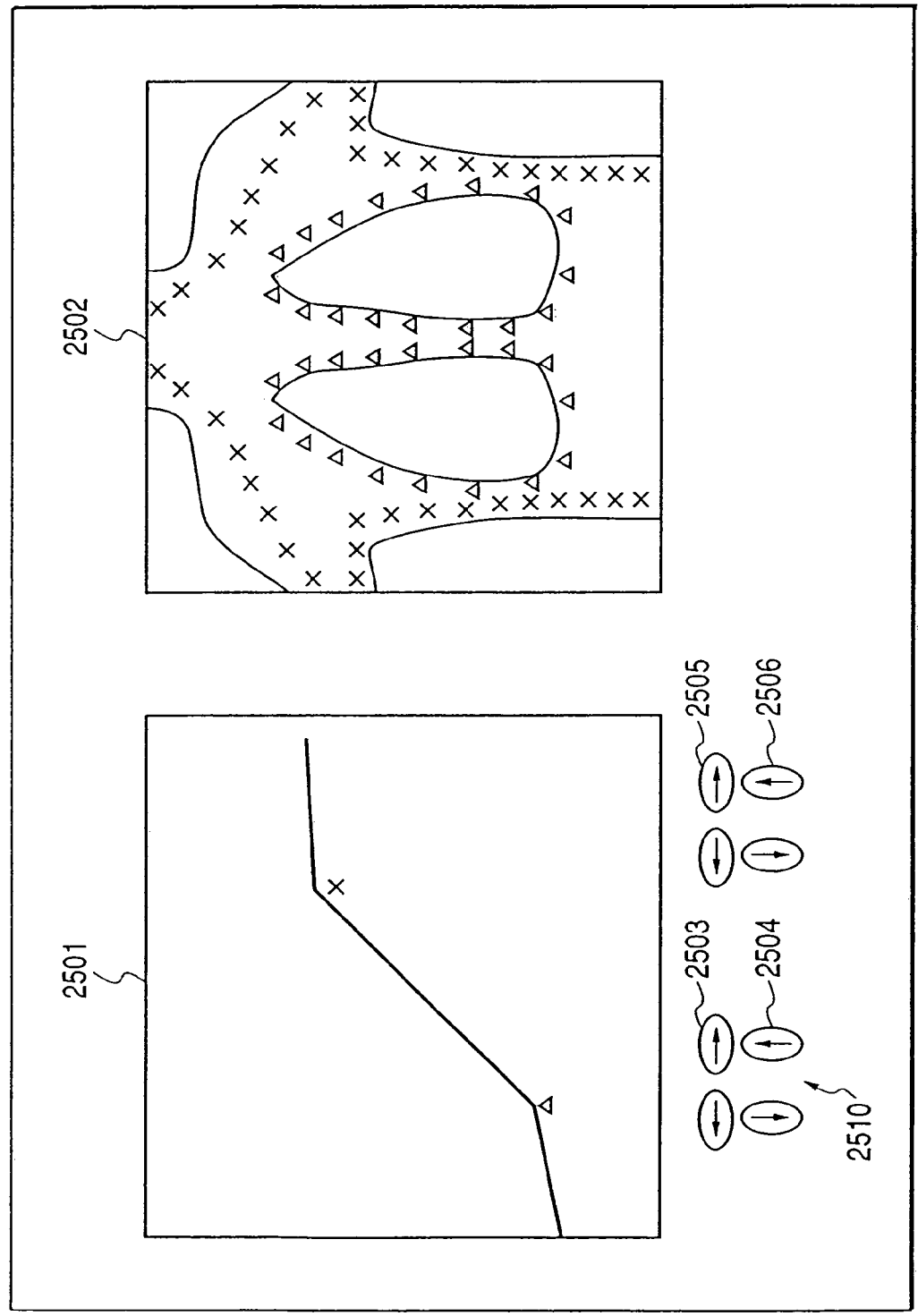
FIG. 29 is a configurational diagram illustrating an image displayed by a control circuit.

Referring to FIG. 29, there is shown a screen displayed on the image display device 2111 by the control circuit, in which a density value conversion curve 2501 is determined by parameters of DRC processing. Diagram 2502 shows an input image or a DRC-processed image and density starting points for the DRC processing; for example, triangles indicate compression density starting points in a low density side and cross marks indicate compression density starting points in a high density side. When using a color monitor, the starting point density values are changed in red or blue. Reference numeral 2510 indicates a changing unit for changing parameters for the DRC processing, having parameter change buttons 2503 to 2506. There are a button 2503 for changing a compression starting point in the low density side, a button 2504 for changing a compression rate in the low density side, a button 2505 for changing a compression starting point in the high density side, and a button 2506 for changing a compression rate in the high density side.

Figure 30:
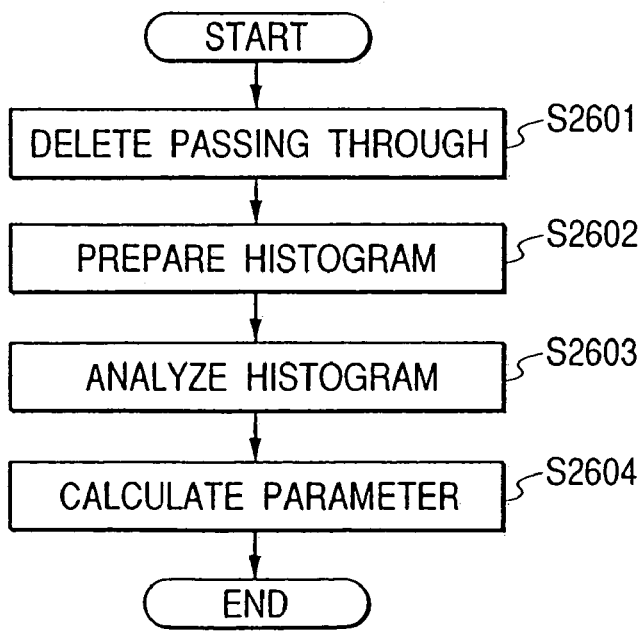
FIG. 30 is a flowchart of a processing of an analysis circuit (1)
Figure 31:
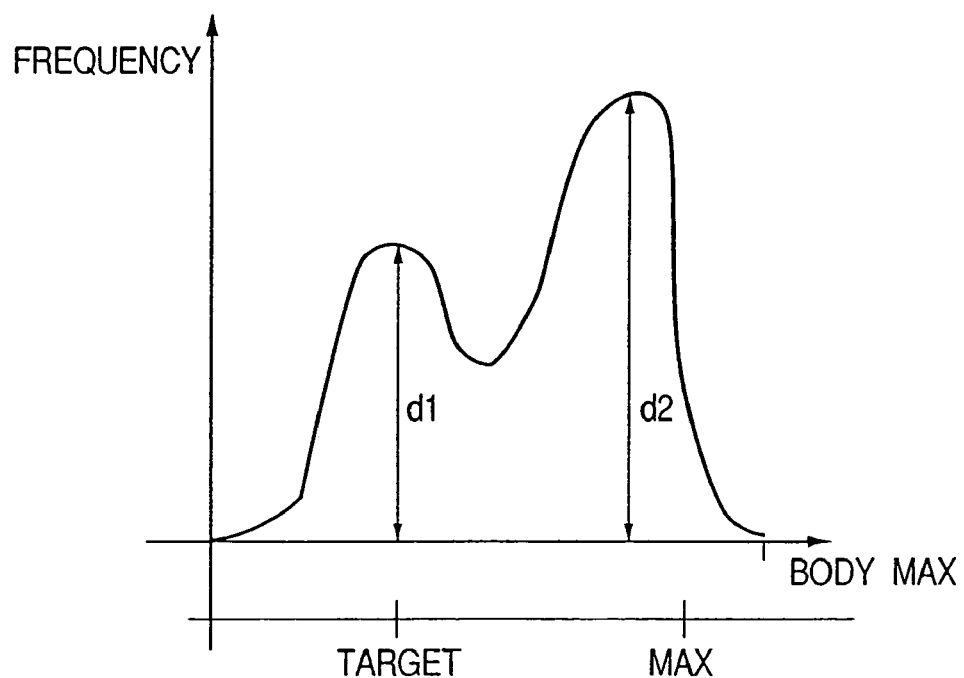
FIG. 31 is a characteristic diagram of a histogram generated by the analysis circuit (1)
Figure 32:
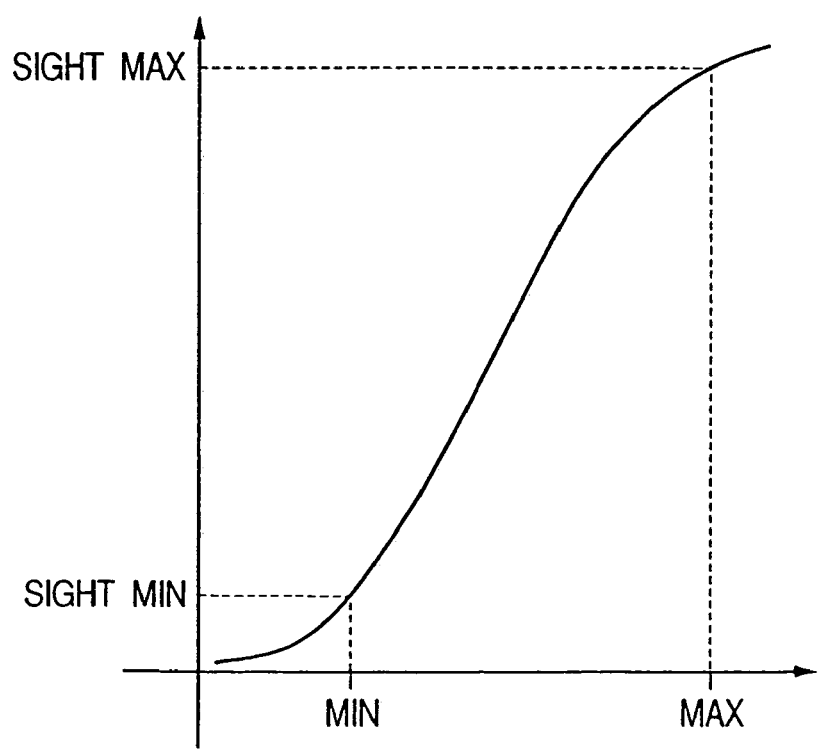
FIG. 32 is a characteristic diagram showing a gradation conversion curve and a visible density value.
Figure 33:
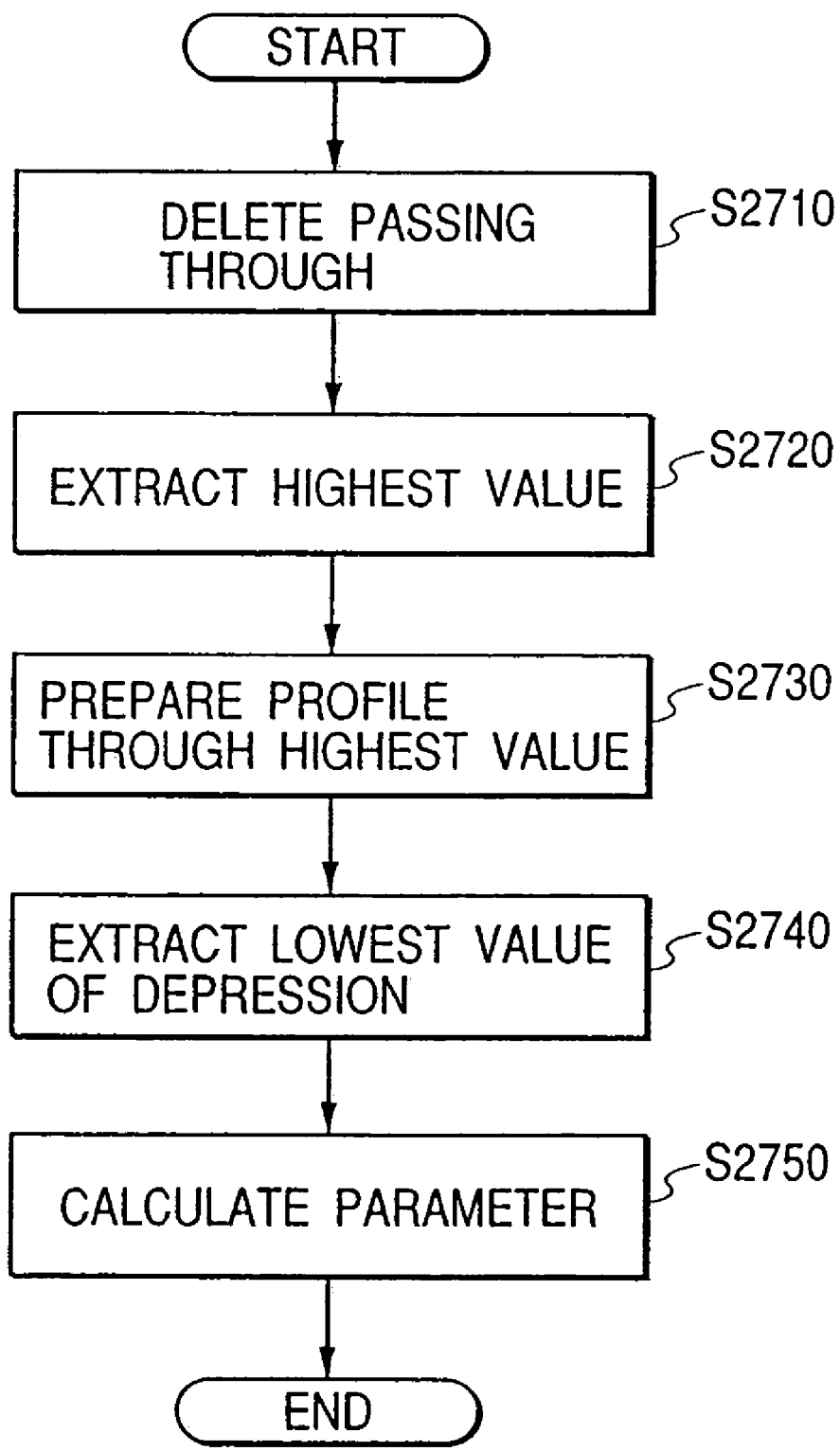
FIG. 33 is a flowchart of a processing of an analysis circuit (2)
Figure 34:
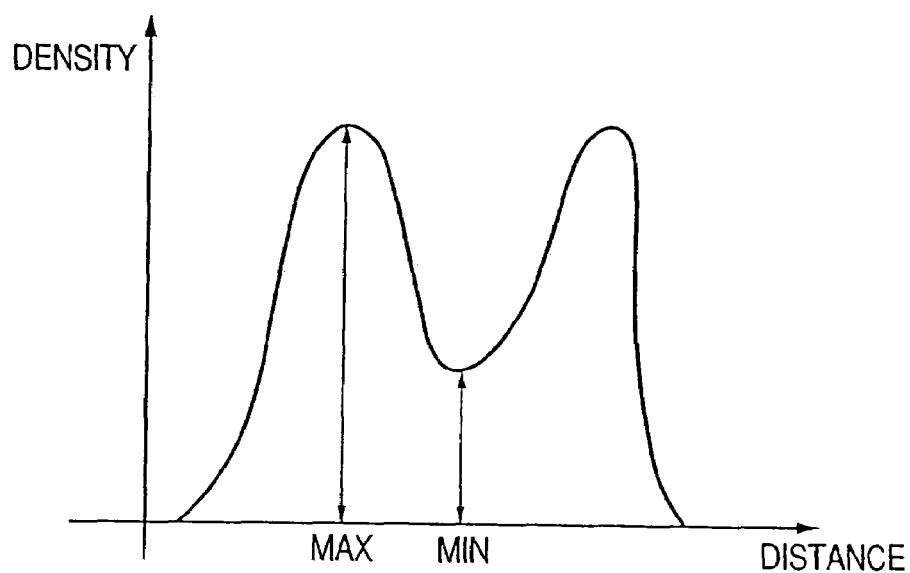
FIG. 34 is a characteristic diagram of a profile generated by the analysis circuit (2)
Figure 35:
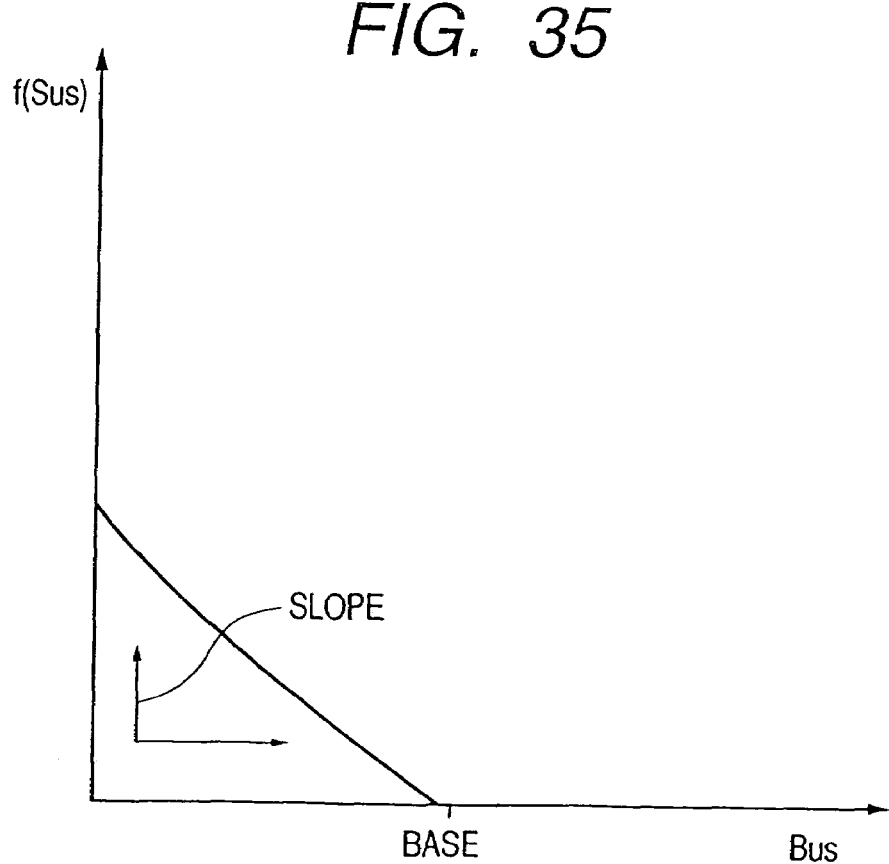
FIG. 35 is a characteristic diagram showing a monotonously decreasing function used for a conventional dynamic range compression.

FIG. 30 shows a flowchart of a processing flow of the above analysis circuit (1) and FIG. 31 shows a diagram of a histogram and a characteristic amount generated by the analysis circuit (1). FIGS. 32, 33, and 34 show a diagram illustrating a relationship between a gradation conversion curve and a visible density value, a flowchart of a processing of an analysis circuit (2), and a diagram illustrating a relationship between a profile generated by the analysis circuit (2) and a characteristic amount, respectively.

Next, an operation of the image processing device 2100 having the above constitution is described below.

The main memory 2109 is used to store various data required for processing of the CPU 2108 and contains a work memory for works of the CPU 2108. The CPU 2108 controls the entire operation of the device following an operation from the operation panel 2110 by using the main memory 2109. Accordingly, the image processing device 2100 operates as described below.

First, an examined object 2103 is irradiated with an X-ray beam 2102 from the X-ray generating circuit 2101. The emitted X-ray beam 2102 passes through the examined object 2103 with being damped and reaches the two-dimensional X-ray sensor 2104 to be output as an X-ray image from the two-dimensional X-ray sensor 2104. In this embodiment, the X-ray image output from the two-dimensional X-ray sensor 2104 is assumed to be an image of a chest, limbs including a knee, and thoracic vertebra, for example.

The data collecting circuit 2105 converts the X-ray image output from the two-dimensional X-ray sensor 2104 to electric signals to supply them to the pre-process circuit 2106. The pre-process circuit 2106 performs preprocessing such as offset correcting processing or gain correcting processing for the signals (X-ray image signals) from the data collecting circuit 2105. The pre-processed X-ray image signals are transferred as an input image to the main memory 2109, an irradiation area extracting circuit 2112, and a passing through deleting circuit 2113a of the density value converting circuit 2113 via the CPU bus 2107 under a control of the CPU 2108.

In the density value converting circuit 2113, there are the passing through deleting circuit 2113a for deleting a passing through area of the image (an area through which the X-ray passes) and a body area in contact with the passing through area within a fixed space, an analysis circuit (1) 2113b for calculating parameters for the DRC processing from areas which have not been deleted by the passing through deleting circuit 2113a for coping with an image of limbs or the like, an analysis circuit (2) 2113c for calculating the parameters for the DRC processing from the areas which have not been deleted by the passing through deleting circuit 2113a for coping with an image of hands and feet or the like, an analysis circuit (3) 2113d for calculating the parameters for the DRC processing from the areas which have not been deleted by the passing through deleting circuit 2113a for coping with an image of a front view of lungs, and an analysis circuit (n) 2113e for calculating the parameters for the DRC processing for coping with an image of other regions, indicating a plurality of analysis circuits in this embodiment.

The DRC circuit 2113f performs the DRC processing for an input image. The control circuit 2113g controls the operation to display an image subjected to the DRC processing by the DRC circuit 2113f and the parameters for the DRC processing on the image display device 2111.

The gradation converting circuit 2114 converts the DRC-processed image in the gradation for a printer (not shown) or the image display device 2111.

Subsequently, the operation of the density value converting circuit 2113 is described below by using the flowchart in FIG. 26.

First, on the basis of an input from the operation panel 2110, it is selected whether the parameters for the DRC processing are automatically calculated by using the analysis circuits 2113a to 2113e or manually input by using the changing unit 2510 (S2201).

Then, the processing for a selection of the manual input is described below.

A predetermined parameter for the DRC processing is input in the DRC circuit 2113*f* and the input image is subjected to the DRC processing. The DRC processing flow is described below by using FIG. 27.

First, the DRC circuit 2113*f* receives an input image f(x, y) from the pre-process circa 2106 or the main memory 2109 and calculates a smoothed image Sus(x, y) on the basis of the following formula (Step S2301):

$$Sus(x, y) = \frac{\int_{-d1}^{d1}\int_{-d2}^{d2} f(x+x1, y+y1)dx1\,dy1}{\int_{-d1}^{d1}\int_{-d2}^{d2} dx1\,dy1} \quad (203)$$

Then, the smoothed image Sus(x, y) is stored in the main memory 2209 until it receives an end signal from the CPU 2208 (Step S2302). Next, a high frequency component fh(x, y) is prepared with the following formula (Step S2303):

$$fh(x, y) = f(x, y) - S_{US}(x, y) \quad (204)$$

Subsequently, the high frequency component fh(x, y) is stored in the main memory 2209 until it receives an end signal from the CPU 2208 (Step S2304).

Next, four parameters for the DRC processing, a compression starting point in the low density side, a compression rate in the low density side, a compression starting point in the high density side, and a compression rate in the high density side are input in the DRC circuit 2113*f* (Step S2305). This input is performed by the changing unit 2510 or for the automatic selection performed with an output value from each analysis circuit or with a default parameter stored in the main memory 2109.

Subsequently, a density value of an original image is converted on the basis of a density value conversion curve F( ) as shown in FIG. 28, for example (Step S2306). In this diagram, F( ) depends upon a compression starting point in the low density side, a compression rate in the low density side, a compression starting point in the high density side, and a compression rate of the high density side, and the compression rate in the low density side is equal to a slope of a straight line a; for example, if the compression rate is 0.3, the slope is 0.3. In addition, a slope of the straight line c is equal to a compression rate in the high density side. Characters low v indicates the compression starting point in the low density side and characters high v indicates the compression starting point in the high density side. A density value is converted on the basis of this density value conversion curve F( ).

Next, the high frequency component fh(x, y) according to a slope of the density value conversion curve F( ) is added to an image fa(x, y) after the density value conversion (Step S2307). A series of processing is expressed by the following formulas at a time:

$$f_c(x, y) = f_a(x, y) + \left(1 - \frac{\partial F(S_{us}(x, y))}{\partial S_{us}(x, y)}\right) \times f_h(x, y), \text{ or,} \quad (205)$$

$$f_c(x, y) = f_a(x, y) + \left(1 - \frac{\partial F(f(x, y))}{\partial f(x, y)}\right) \times f_h(x, y)$$

$$f_a(x, y) = F(f(x, y)) \quad (206)$$

fc(x, y) indicates a mask size for generating a smoothed image of the images d1 an d2 after the DRC processing.

If the processing is completed, the smoothed image and the high frequency component stored in the main memory 2209 are released following an instruction from the CPU 2208. Otherwise, processing from Step S2305 is repeated. In this processing, however, the smoothed image and high frequency component already generated and stored in the main memory 2209 are used.

Next, the control returns to the processing shown in FIG. 26 to convert the DRC-processed image by the gradation converting circuit 2114 on the basis of the gradation curve for the image display device 2111 (Step S2111) and to display the converted image on the image display device 2111 by using the control circuit 2113*g*. This display is shown in 2502 in FIG. 29 (Step S2211). In this diagram, triangles indicate compression density starting points in the low density side and cross marks indicate compression density starting points in the high density side. When using a color monitor, the starting point density values are changed in red or blue. At the same time, the density value conversion curve F( ) used for the DRC processing is displayed as indicated by 2501.

If the DRC-processed image is required to be changed, parameters for the DRC processing are changed by using the changing unit 2510 (Step S2213) and processing is repeated from Step S2208 again. If the processing is terminated, the smoothed image and the high frequency component stored in the main memory 2209 are released.

Next, processing is described for a case in which a method of calculating parameters for the DRC processing according to an analysis circuit is selected in the above step S2201.

First, an analysis circuit is selected based on a predetermined code for each region. For example, parameters for the DRC processing of an image of limbs are extracted for the analysis circuit (1) and processing in FIG. 30 is performed.

The irradiation area extracting circuit 2113*a* receives the input image processed by the pre-process circuit 2106 via the CPU bus 2107 under the control of the CPU 2108 and extracts the irradiation area in the input image. On the other hand, the passing through deleting circuit 2113*a* which has received the input image replaces passing through areas outside and inside the irradiation area and a body area in contact with the passing through areas within a fixed space with 0 pixels (Step S2601). Specifically, the image is converted as follows.

$$f1(x, y) = f(x, y) X \prod_{x1=-d1}^{x1=d1} \prod_{y1=-d2}^{y1=d2} sgn(x+x1, y+y1) \quad (207)$$

where f(x, y) is image data and f1(x, y) is an image as a result of deleting the passing through area and the body area in contact with the passing through area within a fixed space. sgn(x, y) is expressed by the following formula, supposing that Th1 is a constant determined by an experiment and d1 and d2 are constants for determining a width by which a body area is deleted:

If sgn(x, y)=0 and f(x, y)≧Th1, *sgn(x, y)*=1, etc. (208)

Next, a histogram (FIG. 31) for an area which has not been deleted is prepared and analysis processing is performed (Steps S2602 and S2603). Specifically, a shape of the histogram is analyzed to extract a density value Target at a peak position in the low density side and it is assumed to be a compression starting point in the high density side. Furthermore, a compression rate in the high density side is calculated on the basis of the following formula:

$$Ch=(\text{max}-\text{Target}))/(\text{Bodymax}-\text{Target}) \quad (209)$$

where max is a density value corresponding to the maximum density Sightmax which can be recognized visually after a gradation conversion as shown in FIG. 32 and Bodymax is the maximum value of an area after deleting the passing through area. For an image of limbs, only an area in the high density side is compressed.

In the analysis circuit (2), DRC parameters for an image of a front view of lungs are calculated following a processing flow in FIG. 33.

First, an image as a result of deleting the passing through area is obtained by performing processing with the irradiation area extracting circuit 2112 and the passing through deleting circuit 2113a (Step S2710) and the maximum value max is calculated from the image as a result of deleting the passing through area (Step S2720).

Subsequently, a profile through the maximum value is prepared (FIG. 34) (Step S2730) and the minimum value min of a depression is extracted (Step S2740). Then, a compression starting point d1 in the low density side is calculated with the following formula (Step S2750):

$$d1 = min + (max - min)/2 \quad (210)$$

For a front view of an arm, only an area in the low density side is compressed and a fixed value is used as a compression rate.

Analysis circuits (3) to (n) are used for analyzing other regions.

Next, DRC processing is performed by using the DRC circuit 2113f (Step S2208). In this processing, for a parameter in the density side whose area is not compressed, a compression rate is set to 1 and the minimum value of the input image is used for the low density side and the maximum value of the input image is for the high density side as a compression density starting points.

A description of Steps S2210 and after is omitted since it is the same as for a manual input with the changing unit 2510.

The processing which has been described in the above embodiments (for example, shown in FIG. 1) can be applied to processing with the density value converting circuit 2113.

Other Embodiments

The above embodiments can be realized in both hardware and software constitutions. In addition, the processing can be performed by running a program for executing processing of the above flowchart using a computer system formed by the above memory such as the main memory and other devices.

As a storage medium for storing the program, a semiconductor memory such as a ROM or RAM, an optical disk, an optical magnetic disk, or a magnetic storage medium can be used, and a CD-ROM, an FD, a magnetic card, a magnetic tape, or a non-volatile memory card can be used for them.

It is apparent that the above embodiments and equivalent functions can be performed and equivalent effects be obtained even if an operating system or the like running on the computer performs partially or entirely processing or if a program code read from a storage medium is written into an extended function board inserted in a computer or into a memory in an extended function unit connected to a computer and then a CPU or the like in the extended function board or the extended function unit performs partially or entirely processing on the basis of an instruction of the program code, so that these cases are included in the present invention.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An image data processing apparatus which processes image data of a picked up image of an object, comprising:
    a pixel-value extracting unit which extracts pixel values from an object area to define a gradation conversion curve;
    a gradation converting unit which converts the pixel values of the image based on the gradation conversion curve;
    a high-frequency-component conversion unit which converts high frequency components extracted from the image based on a derivative value of the gradation conversion curve; and
    a processed image obtaining unit in which a processed image is obtained based on the image gradation-converted in the gradation converting unit and the high frequency components converted in the high-frequency-component conversion unit.

2. An apparatus according to claim 1, wherein each pixel value is an average of pixel values of pixels existing in a particular area in the object area.

3. An apparatus according to claim 2, wherein each pixel value is a maximum pixel value or a minimum pixel value in the object area.

4. An apparatus according to claim 1, wherein the high frequency components are calculated by subtracting a smoothed image from the picked up image.

5. A method of image-data-processing of a picked up image of an object, comprising:
    a pixel-value extracting step of extracting pixel values from an object area to define a gradation conversion curve;
    a gradation converting step of converting the pixel values of the image based on the gradation conversion curve;
    a high-frequency-component converting step of converting high frequency components extracted from the image based on a derivative value of the gradation conversion curve; and
    a generating step of generating a processed image based on the image having been gradation-converted in the gradation converting step and the high frequency components converted in the high-frequency-component converting step.

6. A storage medium containing a program for use by a computer to execute a method of image data processing of a picked up image of an object, the method comprising:
    a pixel-value extracting step of extracting pixel values from an object area to define a gradation conversion curve;
    a gradation converting step of converting the pixel values of the image based on the gradation conversion curve;
    a high-frequency-component converting step of converting high frequency components extracted from the image based on a derivative value of the gradation conversion curve; and
    a generating step of generating a processed image based on the image having been gradation-converted in the gradation converting step and the high frequency components converted in the high-frequency-component converting step.

7. An image data processing apparatus which processes image data of a picked up image of an object, comprising:
    a pixel-value extracting unit which extracts pixel values showing an average of pixel values of pixels existing in a particular area in the object area, or showing a maximum pixel value and a minimum pixel value in the object area, to define a gradation conversion curve; and a gradation converting unit which converts the pixel values of the image based on the gradation conversion curve so that the average of the image, or the maximum pixel value and the minimum pixel value in the object area, are converted to respective desired pixel values.

8. A method of image data processing of a picked up image of an object, comprising:
- a pixel-value extracting step of extracting pixel values showing an average of pixel values of pixels existing in a particular area in the object area, or showing a maximum pixel value and a minimum pixel value in the object area, to define a gradation conversion curve; and
- a gradation conversion step of converting the pixel values of the image based on the gradation conversion curve so that the average of the image, or the maximum pixel value and the minimum pixel value in the object area are converted to respective desired pixel values.

9. A storage medium containing a program for use by a computer to execute a method of image data processing of a picked up image of an object, the method comprising:
- a pixel-value extracting step of extracting pixel values showing an average of pixel values of pixels existing in a particular area in the object area, or showing a maximum pixel value and a minimum pixel value in the object area, to define a gradation conversion curve; and
- a gradation conversion step of converting the pixel values of the image based on the gradation conversion curve so that the average of the image, or the maximum pixel value and the minimum pixel value in the object area are converted to respective desired pixel values.

10. An image data processing apparatus which processes image data of a picked up image of an object, comprising:
- a pixel-value extracting unit which extracts pixel values from an object area to define a gradation conversion curve;
- a gradation converting unit which converts pixel values of low frequency components of the image based on the gradation conversion curve;
- an addition unit in which pixel values of high frequency components obtained from the image are added onto the pixel values of low frequency components having been subjected to the gradation conversion based on the gradation conversion curve.

11. An image data processing apparatus, comprising:
- a gradation conversion unit for obtaining a gradation-converted image $f0(x, y)$ by gradation-converting an input image $f1(x, y)$;
- a smoothing unit for obtaining a smoothed image $fuso(x, y)$ by smoothing the image $f0(x, y)$;
- another smoothing unit for obtaining a smoothed image $fus(x, y)$ by smoothing the image $f1(x, y)$; and
- an addition unit for adding a high frequency component $(f1(x, y)-fus(x, y))$ to the image $fuso(x,y)$, wherein the high frequency component is obtained by subtracting the image $fus(x, y)$ from the image $f1(x, y)$.

12. An image data processing apparatus, comprising:
- a smoothing unit for obtaining a smoothed image $fus(x, y)$ by smoothing the image $f1(x, y)$; and
- a gradation conversion unit for obtaining a gradation-converted image $fus0(x, y)$ by gradation-converting the image $fus(x, y)$; and
- an addition unit for adding a high frequency component $(f1(x, y)-fus(x, y))$ to the image $fuso(x,y)$, wherein the high frequency component is obtained by subtracting the image $fus(x, y)$ from the image $f1(x, y)$.

13. An image data processing apparatus, comprising:
- a gradation conversion unit for obtaining a gradation-converted image $f0(x, y)$ by gradation-converting an input image $f1(x, y)$;
- a smoothing unit for obtaining a smoothed image $fus(x, y)$ by smoothing the image $f1(x, y)$; and
- an addition unit for obtaining a processed image $fd(x, y)$ based on the image $f0(x, y)$ and a high frequency component $(f1(x, y)-fus(x, y))$ which is obtained by subtracting the image $fus(x, y)$ from the image $f1(x, y)$.

14. An image data processing apparatus, comprising:
- a gradation conversion unit for obtaining a gradation-converted image $f0(x, y)$ by gradation-converting an input image $f1(x, y)$; and
- an addition unit for obtaining a processed image $fd(x, y)$ based on the gradation-converted image $f0(x, y)$ and a high frequency component of the gradation-converted image $f0(x, y)$.

* * * * *